:::

(12) United States Patent
Kawanishi et al.

(10) Patent No.: US 7,425,696 B2
(45) Date of Patent: Sep. 16, 2008

(54) PHOTOELECTRIC OSCILLATOR

(75) Inventors: Tetsuya Kawanishi, Koganei (JP);
Masayuki Izutsu, Koganei (JP);
Takahide Sakamoto, Koganei (JP);
Satoshi Shinada, Koganei (JP)

(73) Assignee: National Institute of Information and Communications Technology Incorporated Administrative Agency, Koganei-shi (JP)

( * ) Notice: Subject to any disclaimer, the term of this patent is extended or adjusted under 35 U.S.C. 154(b) by 320 days.

(21) Appl. No.: 11/060,565

(22) Filed: Feb. 18, 2005

(65) Prior Publication Data

US 2005/0211875 A1 Sep. 29, 2005

(30) Foreign Application Priority Data

| Feb. 19, 2004 | (JP) | ............................. 2004-042955 |
| Jun. 8, 2004 | (JP) | ............................. 2004-169650 |

(51) Int. Cl.
*G01N 21/25* (2006.01)
(52) U.S. Cl. .................................... 250/227.23; 398/76
(58) Field of Classification Search ............. 250/214 R, 250/227.23; 398/76
See application file for complete search history.

(56) References Cited

U.S. PATENT DOCUMENTS

| 5,723,856 | A | * | 3/1998 | Yao et al. ................ 250/227.11 |
| 5,742,268 | A | * | 4/1998 | Noda .......................... 345/84 |
| 5,777,778 | A | * | 7/1998 | Yao ............................. 359/245 |
| 5,917,179 | A | * | 6/1999 | Yao ........................ 250/227.11 |
| 6,175,672 | B1 | * | 1/2001 | Newberg et al. ............... 385/24 |
| 6,362,913 | B2 | * | 3/2002 | Ooi et al. ..................... 359/245 |
| 2003/0147591 | A1 | * | 8/2003 | Doi et al. ....................... 385/39 |
| 2003/0210915 | A1 | * | 11/2003 | Miyata et al. ............... 398/198 |
| 2004/0114941 | A1 | * | 6/2004 | Ogusu ........................ 398/183 |
| 2004/0264977 | A1 | * | 12/2004 | Yap et al. .................... 398/161 |

FOREIGN PATENT DOCUMENTS

| JP | 2000-307518 | 11/2000 |
| JP | 2002-72158 | 3/2002 |

\* cited by examiner

*Primary Examiner*—Georgia Y. Epps
*Assistant Examiner*—Kevin Wyatt
(74) *Attorney, Agent, or Firm*—Oblon, Spivak, McClelland, Maier & Neustadt, P.C.

(57) ABSTRACT

A photoelectric oscillator includes a laser beam projection unit; an optical modulator on an optical path extending from the projection unit, which optical modulator outputs a modulated signal or an optical signal containing a harmonic of the modulated signal and includes a modulation electrode whose resonant frequency band includes the frequency band of the modulation signal; a photoelectric converter for converting the output of the optical modulator to an electric signal; a feedback circuit for selecting from the radio-frequency electric signal obtained from the photoelectric converter an electric signal to be re-supplied to the optical modulator; and an output section for outputting an optical signal containing the modulation signal or a harmonic of the modulation signal or outputting the modulation signal or a harmonic of the modulation signal. A laser beam of sufficient intensity is input from the projection unit to produce a radio-frequency electric signal in the feedback circuit, and the radio-frequency electric signal or an optical signal containing the radio-frequency electric signal or the radio-frequency signal is output from the photoelectric oscillator.

13 Claims, 22 Drawing Sheets

F I G. 5 ( a )
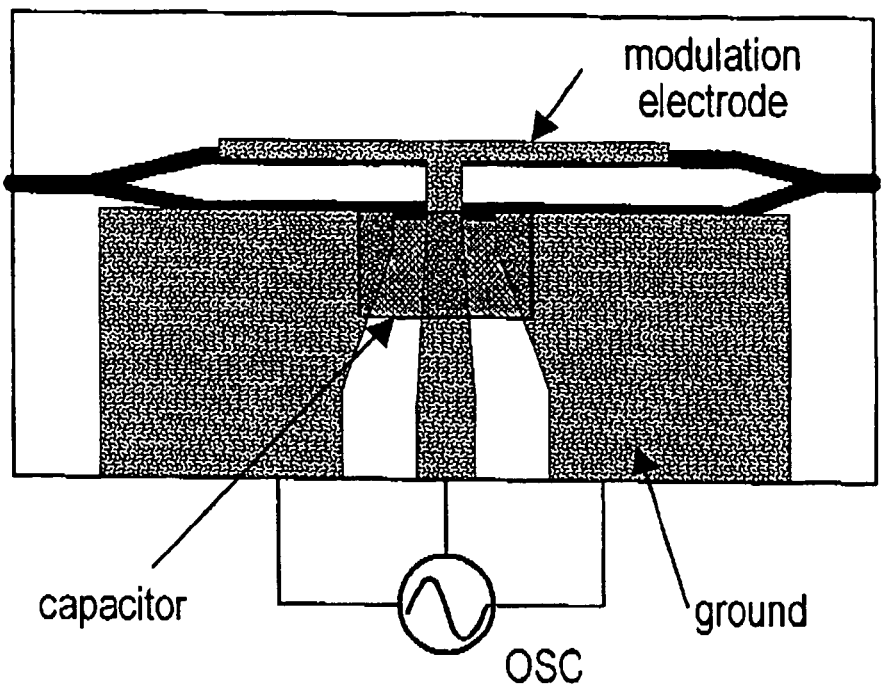
F I G. 5 ( b )
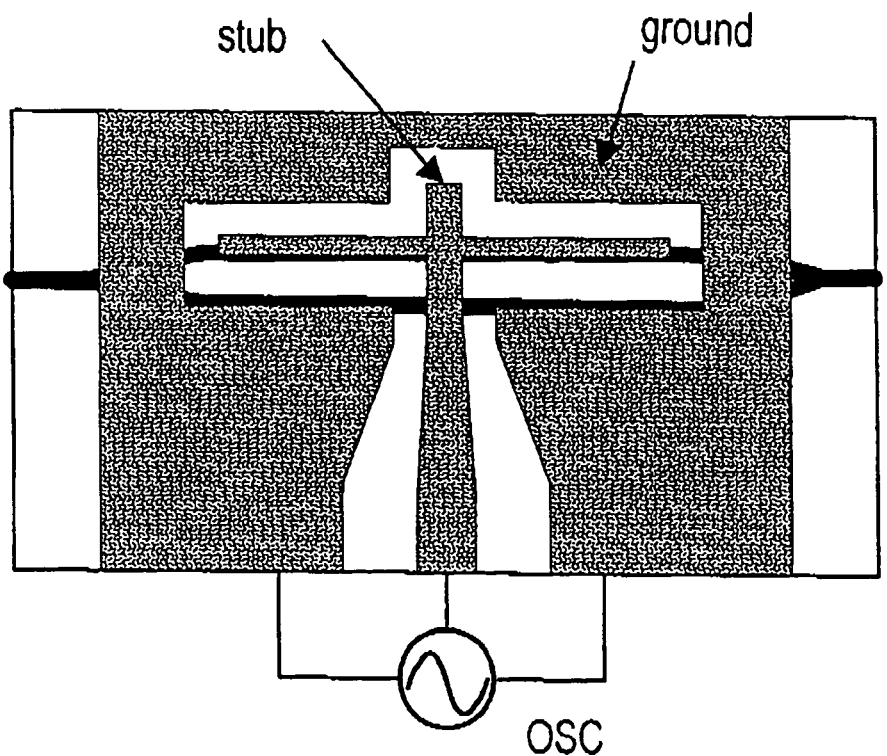

A"  LiNbO₃  A temperature controller

LiNbO$_3$ temperature controller

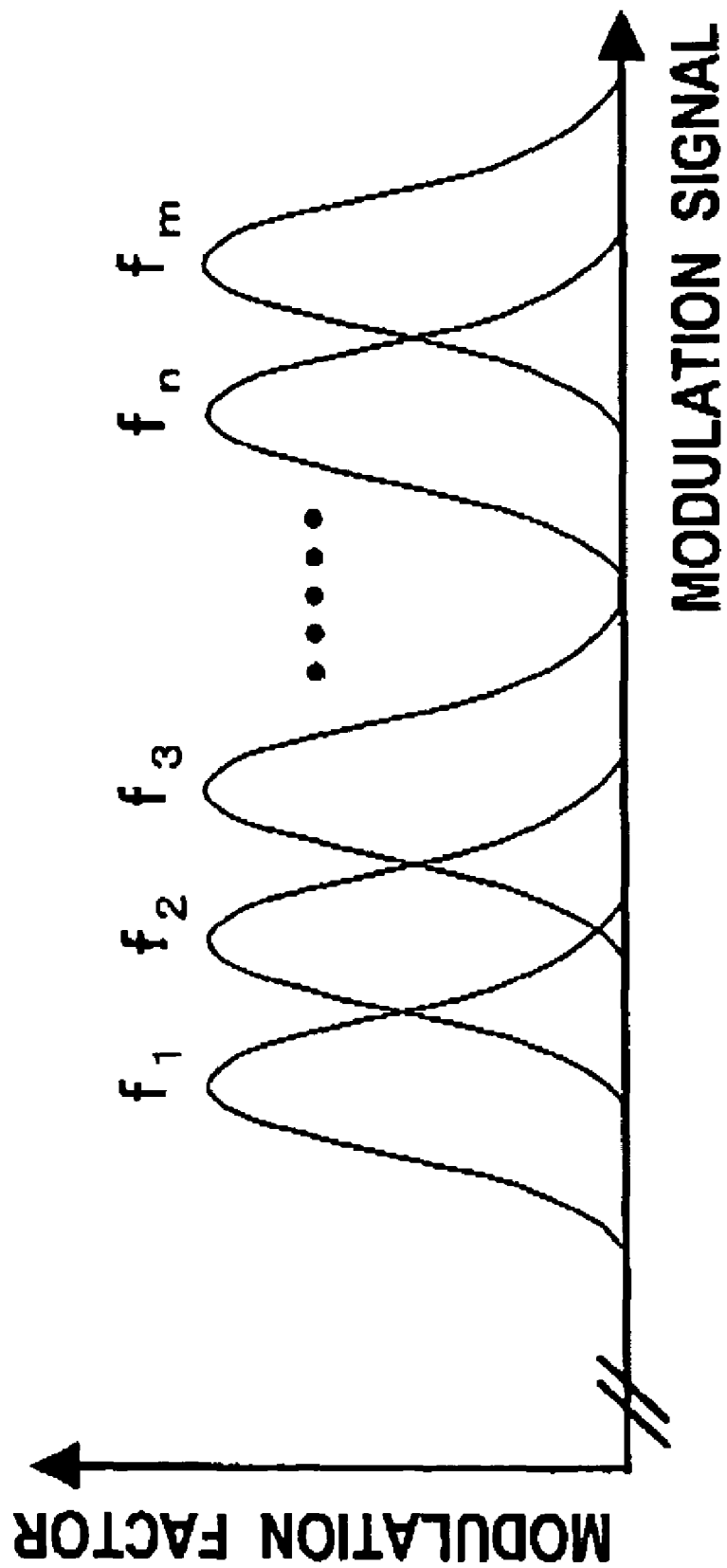

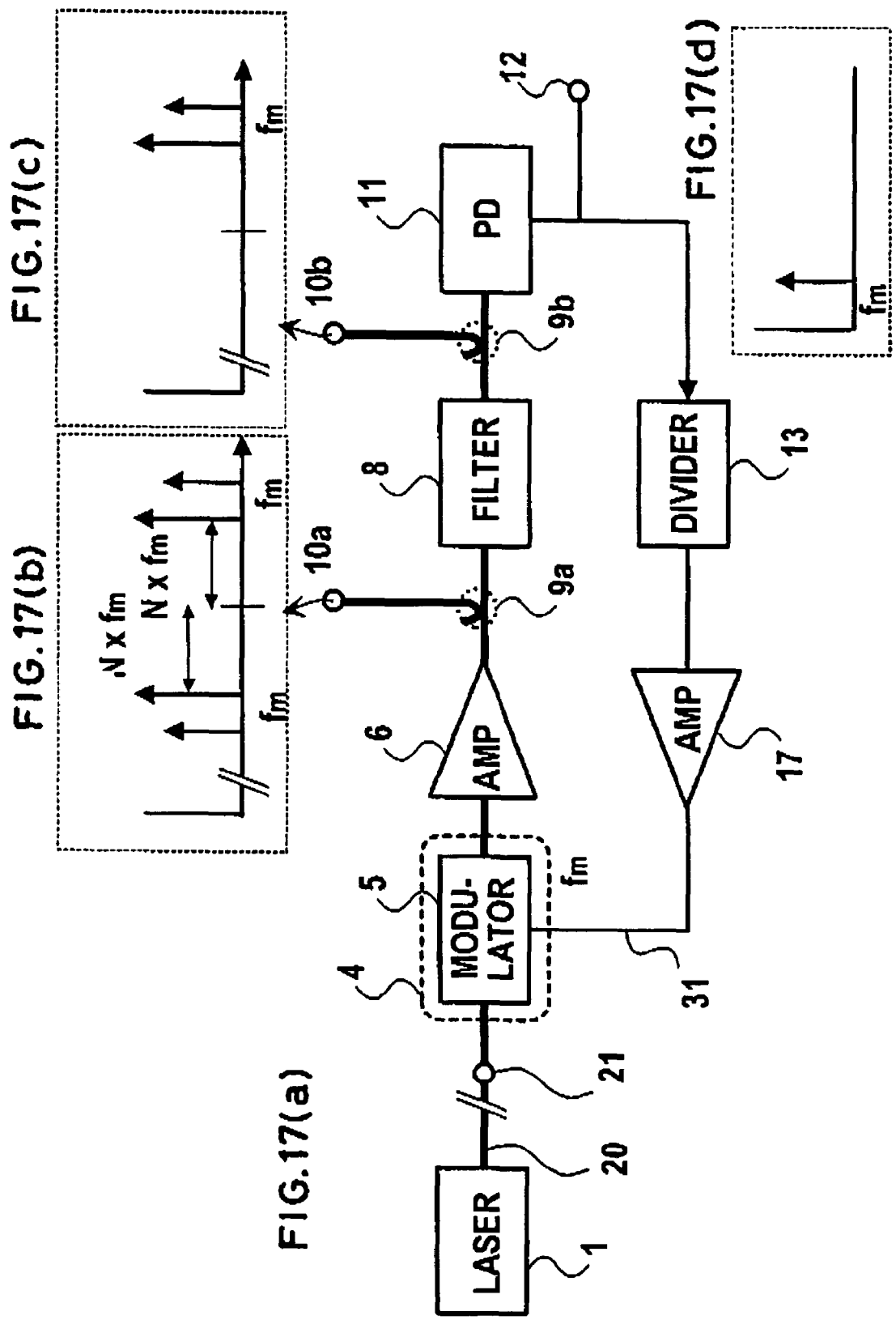

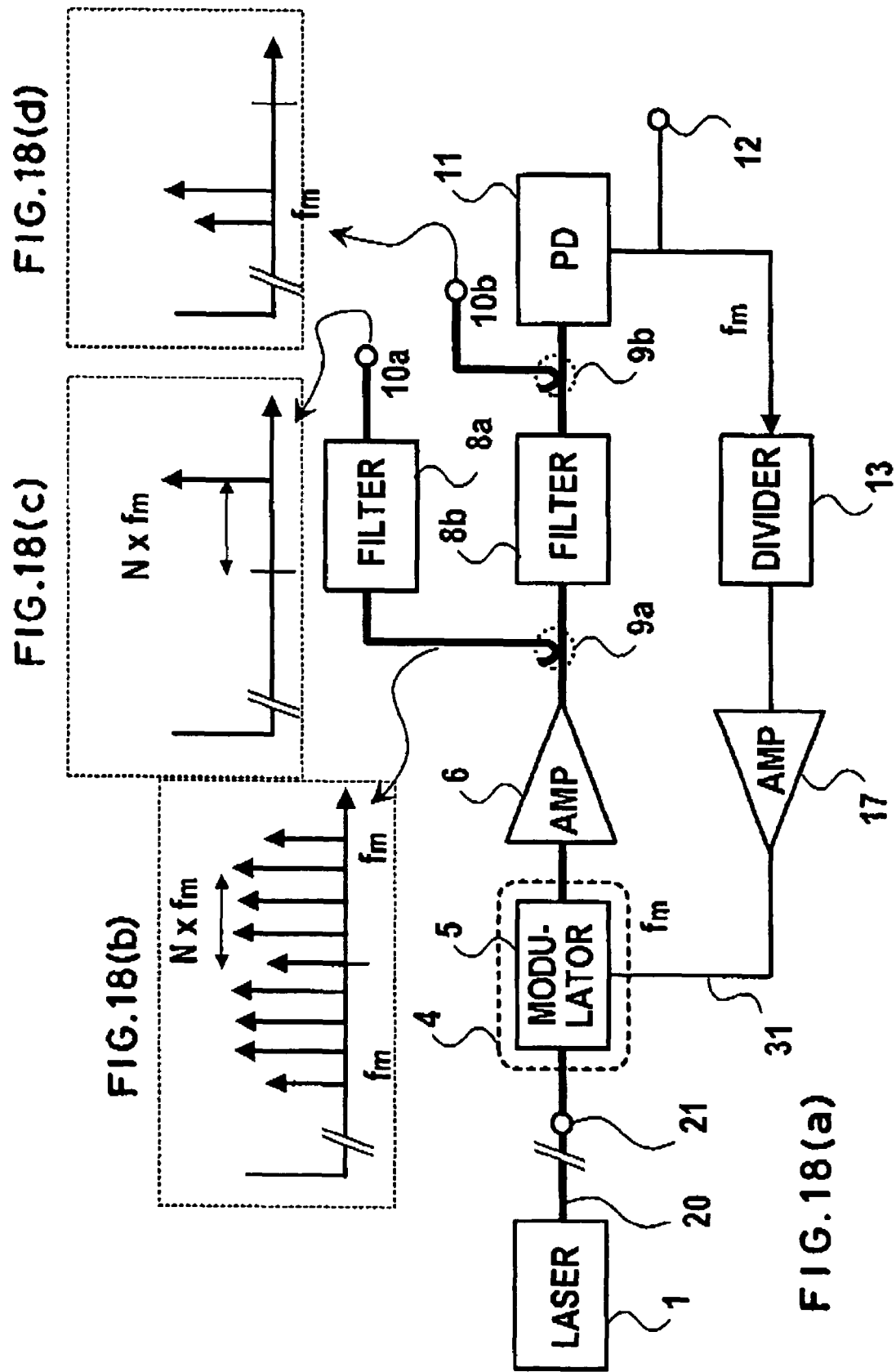

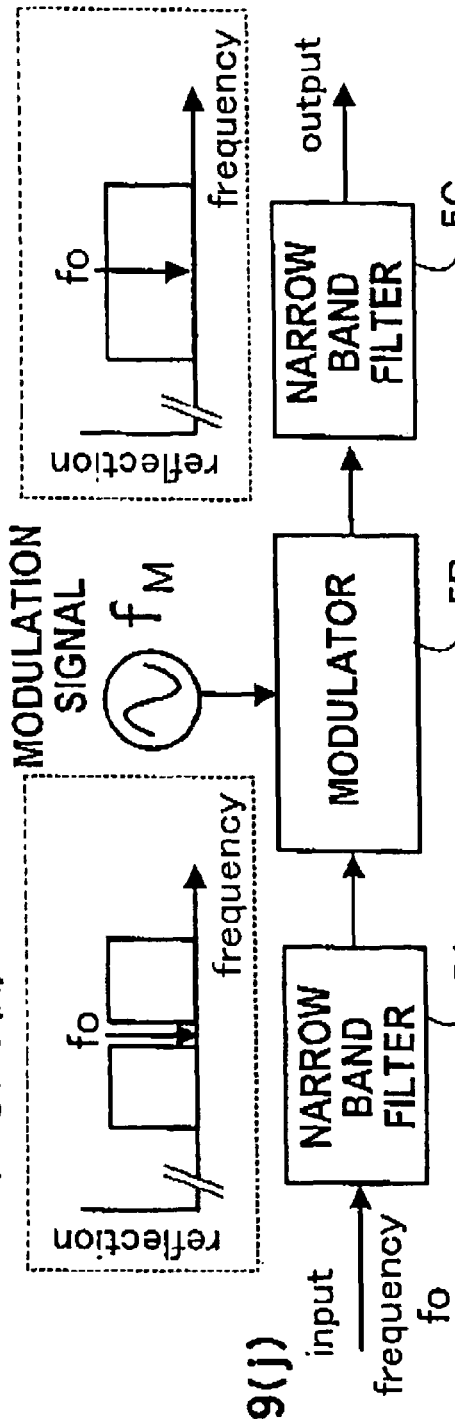

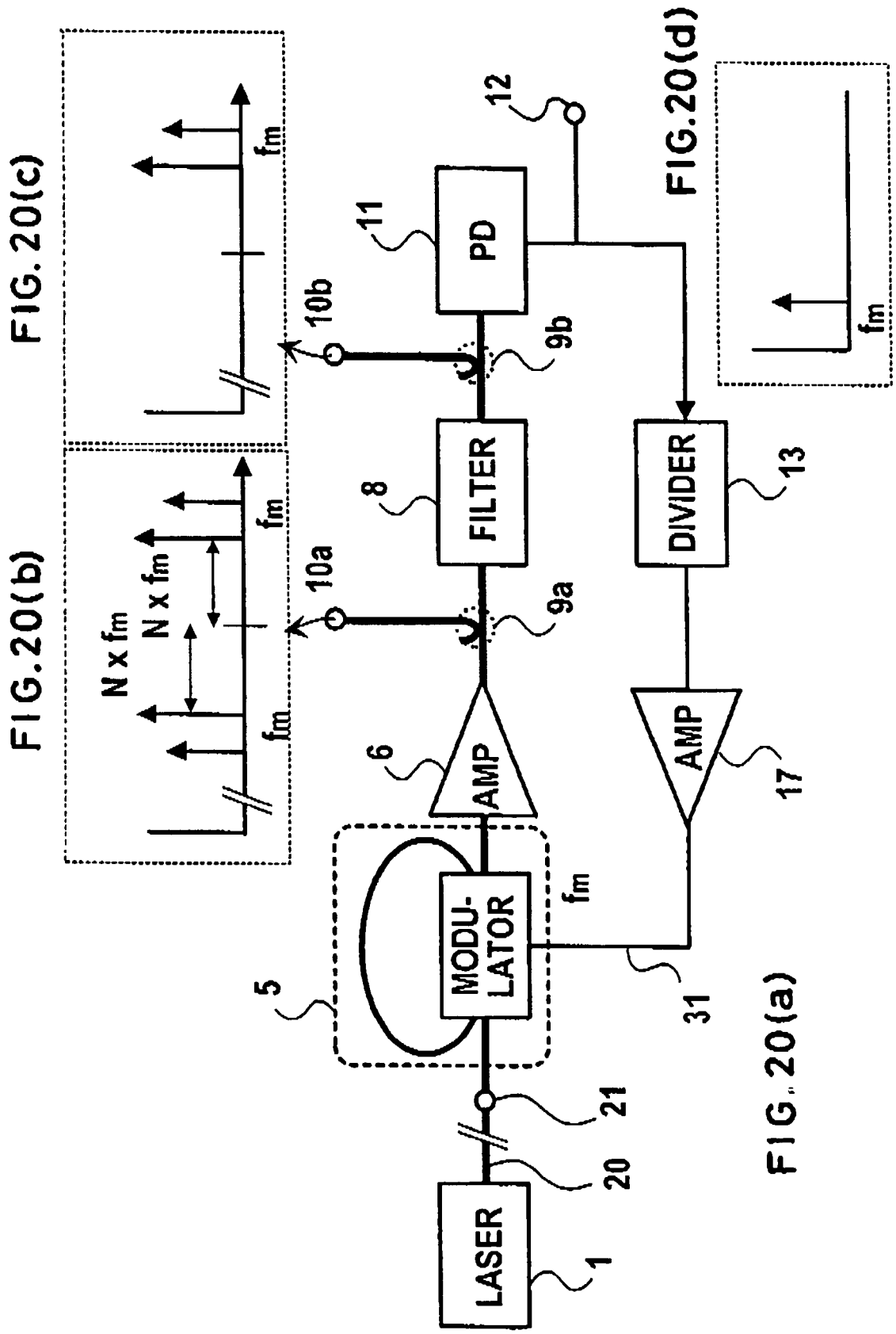

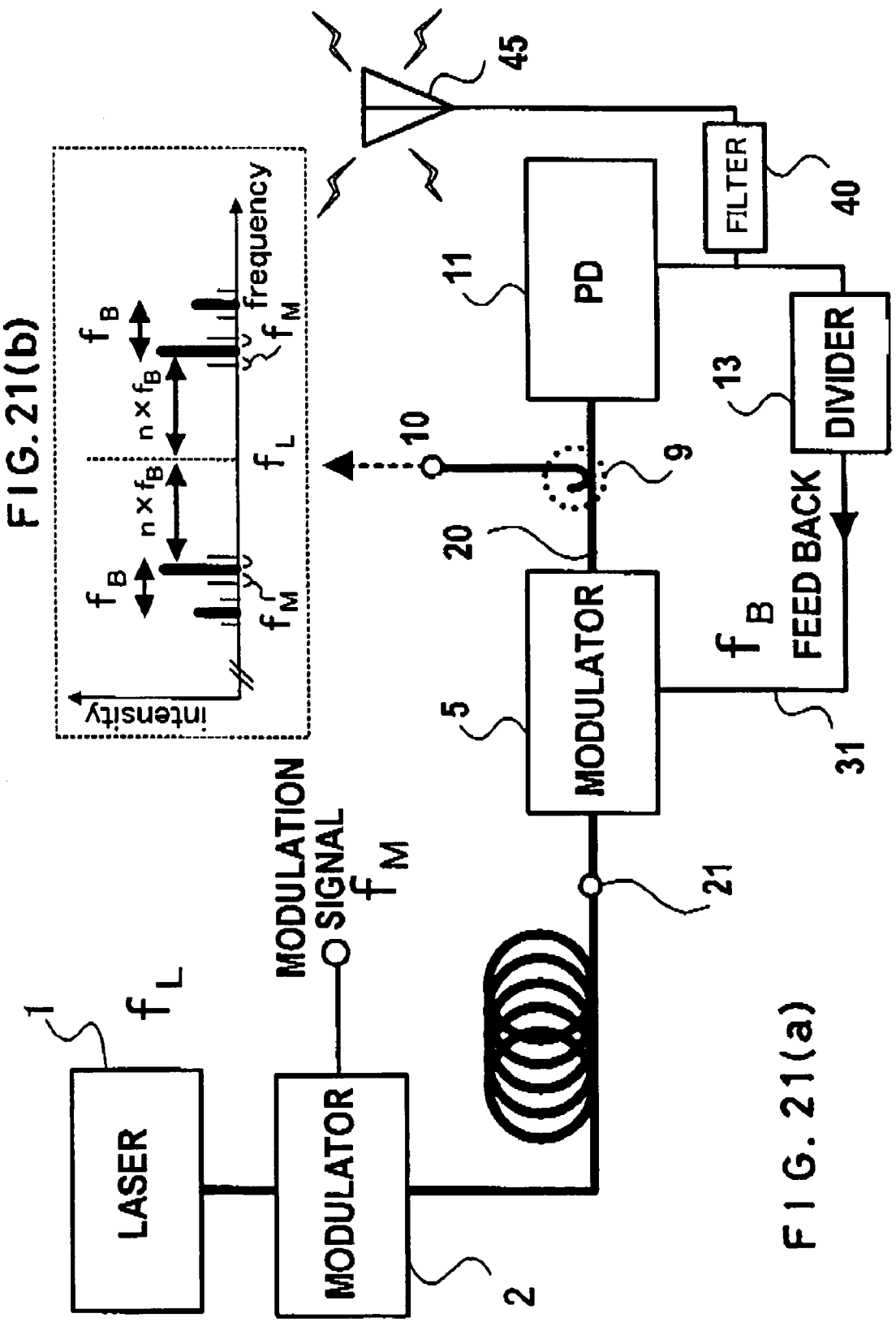

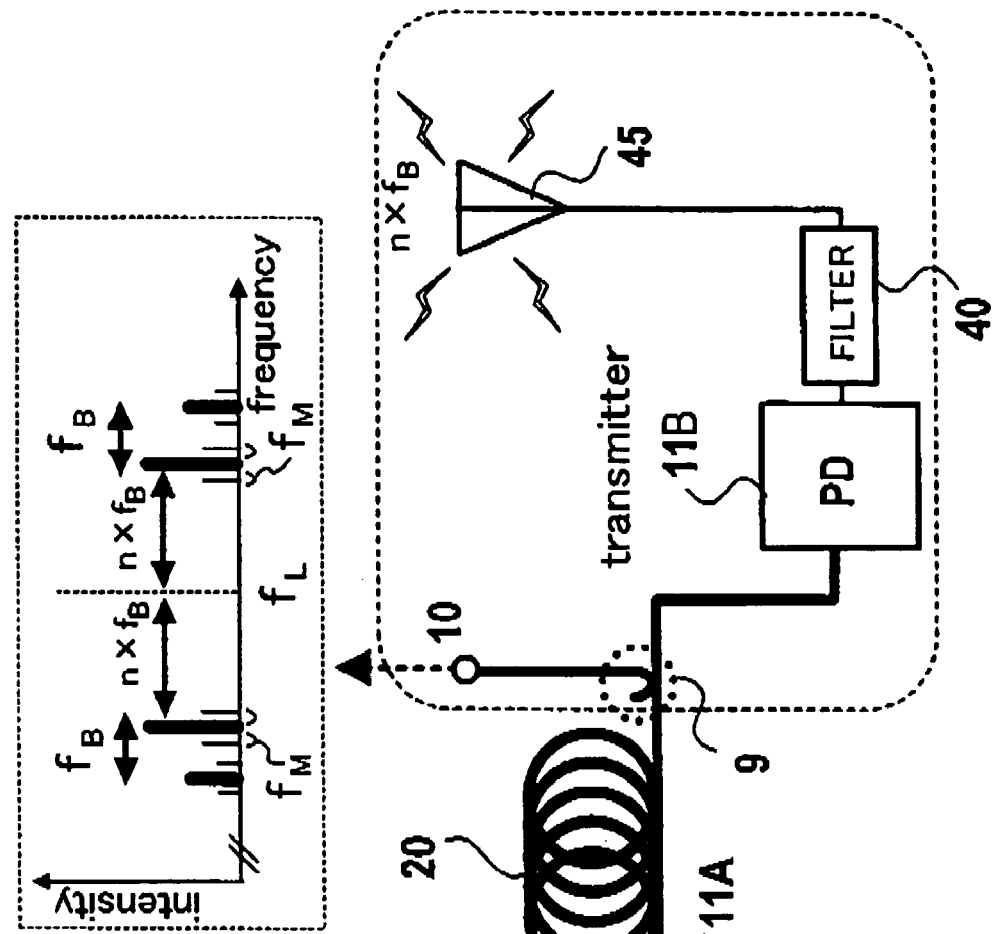
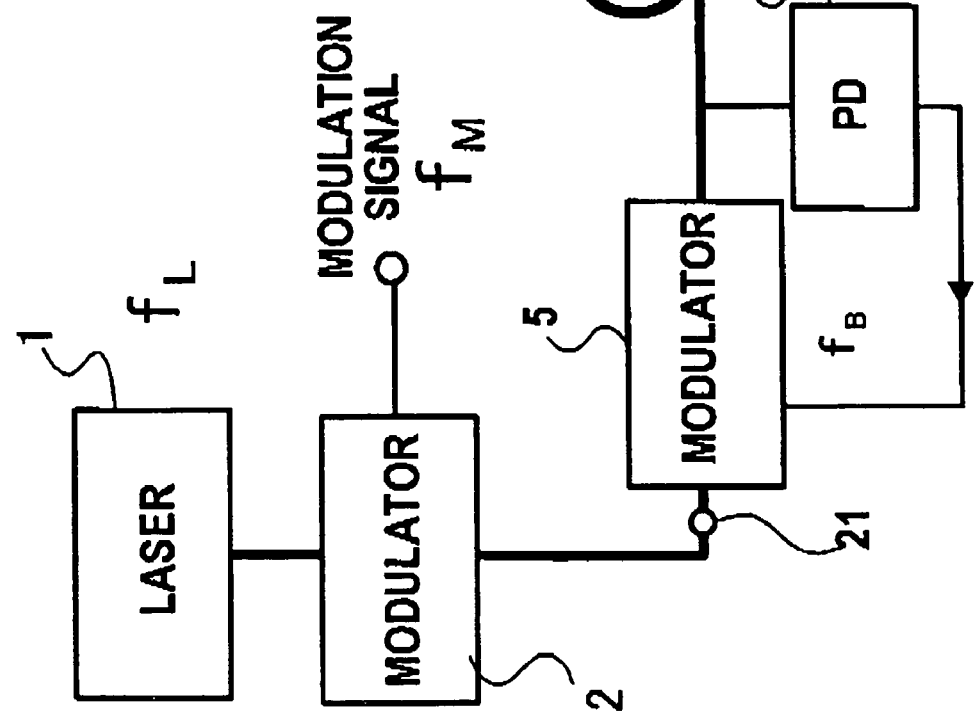

PHOTOELECTRIC OSCILLATOR

BACKGROUND OF THE INVENTION

1. Field of the Invention

This invention relates to a photoelectric oscillator capable of acquiring energy from an incident laser beam and generating a millimeter wave, microwave or other radio-frequency signal, particularly a photoelectric oscillator whose internal optical modulator is provided with a frequency selection characteristic to enable generation of a signal having a high frequency selected by the selection characteristic or a signal having a frequency that is a natural number multiple of the high frequency selected by the selection characteristic.

2. Description of the Prior Art

The photoelectric oscillator is an oscillator that achieves oscillating operation by feeding back a sideband component produced by laser beam modulation as a modulation signal. The feedback loop of the oscillator is constituted of an optical circuit and an RF (radio-frequency) circuit. During oscillating operation, therefore, it enables, without use of an external modulation signal, simultaneous acquisition of a signal composed of an oscillation signal of the same frequency superimposed on a modulated signal and an RF signal. It is also well known that injection-locked operation of the photoelectric oscillator can be achieved by inputting an optical signal or an RF signal, thereby enabling oscillation frequency control.

A block diagram of the structure of a conventional photoelectric oscillator is shown in FIG. 1. A laser beam from a laser beam source is intensity-modulated by an optical modulator, the intensity-modulated beam is amplified, and the amplified beam is converted to a radio-frequency signal by a photodiode. The radio-frequency signal is amplified, passed through a bandpass filter, and again used to modulate the laser beam.

Thus the conventional photoelectric oscillator suppresses loop gain outside the desired frequency band to enable single mode oscillating operation. The suppression is usually achieved by using a bandpass filter. The conventional photoelectric oscillator therefore unavoidably has a complex configuration. Moreover, the use of a traveling-wave broadband modulator as the optical modulator increases the size of the photoelectric oscillator large and makes improvement of modulation efficiency difficult. The amount power required during oscillating operation, including that for the laser beam, is therefore disadvantageously large.

During photoelectric oscillation, an optical signal and an electric signal of the same frequency are simultaneously output from the "optical output" section and the "RF output" section (see FIG. 1). As is well known, such a photoelectric oscillator is usually configured so that the upper limit of the oscillation frequency is governed by the upper limit of the frequency band of the electric circuit in the feedback circuit section. This is because, generally, broadband operation of the optical circuit can be adequately achieved but making the electric circuit capable of broadband operation is technically difficult. Because of the limited bandwidth of the electric circuit, the upper frequency limit of the optical modulated signal obtainable with a conventional photoelectric oscillator is low.

SUMMARY OF THE INVENTION

This invention relates to a photoelectric oscillator that utilizes the energy of an incident laser beam to maintain radio-frequency oscillation. It is therefore equipped with a laser beam projection unit. An optical path extends from the projection unit and an optical modulator is installed on the optical path. The optical modulator outputs an optical signal including a modulation signal or a harmonic of the modulation signal. An optical modulator usually conducts modulation by applying a voltage to a photoelectric device. The optical modulator is provided internally with a modulation electrode for applying the voltage. The modulation electrode is known to have a resonant frequency determined by its structure. In the present invention, the frequency band of the modulated signal is included in the resonant frequency band of the modulation electrode.

The output of the optical modulator, which is an optical signal superimposed with the modulation signal, is again converted to a radio-frequency electric signal. In the conversion, the modulated signal is demodulated and harmonics of the modulated signal are generated concurrently. A photoelectric converter is used for this.

An electric signal to be again supplied to the optical modulator is selected from the radio-frequency electric signal obtained from the photoelectric converter in the foregoing manner. Although frequency division may sometimes be conducted in this selection, it is not always conducted. When frequency division is conducted, the selection is in some cases followed by frequency division and in some cases by frequency filter. When frequency filter is conducted after frequency division, the pass band thereof can be made the same as the resonant frequency band. When the pass band is coincident with the resonant frequency band, the number of components can be reduced because the selection can be made using the frequency characteristics of the modulator. In such frequency division and selection, it is important to feed back to the optical modulator, as a modulation signal, an electric signal of the same frequency as the modulated signal. The feedback circuit of the present invention meets this requirement.

Further, as pointed out in the foregoing, in the photoelectric oscillator of the present invention, the electric signal includes the modulated signal or a harmonic thereof and the optical signal involves the modulated signal or an optical signal containing a harmonic of the modulated signal. The electric signal and optical signal can be output to be used for another purpose. An electric signal output section and an optical signal output section are therefore provided.

The photoelectric oscillator requires a laser beam of sufficient intensity for maintaining radio-frequency oscillation. A laser beam of an intensity exceeding the threshold above which radio-frequency oscillation occurs in the oscillation circuit is therefore projected from the projection unit.

When the bandpass characteristic of the optical modulator is insufficient as a frequency selection characteristic, the feedback circuit is preferably provided with a radio-frequency electric signal amplifier whose band pass characteristic has a portion overlapping the bandpass characteristic of the optical modulator. Such an amplifier can be configured by combining a passive filter and an amplifier whose frequency characteristic is flat in this band.

The oscillation frequency and the oscillation mode can be regulated by providing a delay circuit capable of delay time adjustment in the feedback circuit. For example, harmonics can be suppressed by setting the delay time sufficiently long, while radio-frequency oscillation can be stabilized by setting an appropriate delay time.

Moreover, provision of a delay circuit capable of delay time adjustment on the optical path between the optical modulator and the photoelectric converter similarly enables regulation of the oscillation frequency and the oscillation mode, making it possible to stabilize radio-frequency oscillation by setting an appropriate delay time.

When the intensity of the output from the optical modulator is insufficient to maintain radio-frequency oscillation, the optical signal with superimposed modulation signal is preferably supplied to the photoelectric converter after being amplified by an optical amplifier so as to obtain an electric signal of sufficient intensity.

When the temperature of an optical modulator having a resonant electrode structure is changed, the size of the optical modulator changes slightly owing to thermal expansion or contraction. This invention positively utilizes this effect to regulate the oscillation frequency of the photoelectric oscillator.

The aforesaid optical modulator can, for instance, be implemented as a Mach-Zehnder interference modulator. In the Mach-Zehnder interference modulator an optical signal input on a single optical path is generally split between two optical paths, phase modulated on one of the optical paths, recombined, and output. The phase modulation is conducted using a phase modulator that utilizes an electro-optic effect produced by a voltage applied to an electrode provided on an electro-optic crystal. The present invention uses a plurality of phase modulators having resonant electrodes that differ slightly in resonant frequency. Each phase modulator is applied with a signal obtained by regulating the amplitude or phase of the photoelectric converter output and is equipped with means for varying the regulation of amplitude or phase to control the transmission frequency characteristic of the Mach-Zehnder interference modulator with respect to the radio-frequency electric signal.

Each of the two optical paths of the Mach-Zehnder interference modulator is provided with a phase modulator. The phase modulator provided on the first optical path and the phase modulator provided on the second optical path, have a common resonance band. Although the radio-frequency signals applied to the Mach-Zehnder interference modulator both belong to the common resonance band, they are imparted with a predetermined phase shift. The radio-frequency signal is of course from the feedback circuit.

The optical modulator can be a reciprocating optical modulator that repeats modulation every reciprocation on a reciprocal optical path. Use of this modulator enables ready generation of radio-order side bands, so that substantially the same effect can be obtained as when modulating with signal whose frequency is a natural number multiple of the modulation signal. The modulation signal is effective when it is in the resonant frequency band of the modulation electrode of the reciprocating optical modulator.

The optical modulator can instead be a loop optical path optical modulator fabricated by combining an optical modulator having a resonant electrode structure and an optical path of loop structure so as to conduct modulation every circuit of the optical path. Use of such a loop optical path optical modulator enables ready generation of high-order side bands, so that substantially the same effect can be obtained as when modulating with a signal whose frequency is a natural number multiple of the modulation signal. The modulation signal used at this time is effective when it is in the resonant frequency band of the modulation electrode of the loop optical path optical modulator.

When the feedback signal has insufficient intensity for use a modulation signal, the feedback circuit is preferably provided with an amplifier for amplifying the feedback signal.

It is known that modulation using an optical phase modulator as the optical modulator causes the spectrum of the modulated optical signal to spread. Excess modes contained in the output of the photoelectric oscillator of the present invention can be suppressed by suppressing transmission of harmonics from such a spread optical spectrum as modulation signals.

As in a radio-frequency oscillator fabricated as a purely electronic circuit, pull-in synchronization is induced in the photoelectric oscillator of the present invention by injection of a sufficiently strong signal. In the present invention this is achieved by injecting a sufficiently strong radio-frequency electric signal into the feedback circuit. This injection enables output of an optical signal containing a radio-frequency signal synchronized with the injected radio-frequency electric signal or a frequency-multiplied radio-frequency electric signal. A radio-frequency signal whose frequency is a natural number multiple of the frequency of the injected radio-frequency signal can be obtained by photoelectrically modulating this optical signal.

Although a radio-frequency electric signal is injected in order to utilize pull-in synchronization in the foregoing case, it is possible instead to input an optical signal superimposed with a radio-frequency electric signal. This similarly enables output of an optical signal containing a radio-frequency signal synchronized with the superimposed radio-frequency electric signal or an optical signal containing a radio-frequency electric signal synchronized with said radio-frequency electric signal.

Owing to the use of a resonant electrode structure type optical modulator, the present invention enables size reduction by shortening of the modulator electrode. Moreover, power consumption can be minimized because the improved modulation efficiency lowers the laser beam intensity threshold above which radio-frequency oscillation starts. In addition, the structure of the photoelectric oscillator can be simplified because the filter capability of the modulator makes it possible to impart the feedback circuit with frequency selectivity.

Owing to the use of an optical modulator having frequency multiplying capability, it is possible to realize photoelectric oscillation operation that exceeds the oscillation frequency limit that can be established using electric circuit technology. That is, notwithstanding that the signal fed back to the modulator is within the band of the electric circuit, a photoelectric oscillator can be realized that in effect achieves high-frequency operation unattainable by the prior art because an optical modulation signal whose frequency is an integral multiple of feedback signal frequency can be produced.

Further features of the invention, its nature and various advantages will be more apparent from the accompanying drawings and following detailed description of the invention.

BRIEF DESCRIPTION OF THE DRAWINGS

FIG. 5a is a diagram showing a resonant electrode optical modulator that can be used in the photoelectric oscillators of FIGS. 3 and 4.

FIG. 5b is a diagram showing another resonant electrode optical modulator that can be used in the photoelectric oscillators of FIGS. 3 and 4.

FIG. 6b is a side view of the resonant electrode optical modulator shown in FIG. 6a.

FIG. 7b is a side view of the resonant electrode optical modulator shown in FIG. 7a.

FIG. 8b is a side view of the resonant electrode optical modulator shown in FIG. 8a.

FIG. 9b is a side view of the resonant electrode optical modulator shown in FIG. 9a.

FIG. 10b is a side view of the resonant electrode optical modulator shown in FIG. 10a.

FIG. 15 is a graph showing a distribution of modulation electrode resonance characteristic.

FIG. 17a shows a photoelectric oscillator according to the present invention that uses a frequency multiplier optical modulator.

FIG. 17b is a diagram showing the optical spectrum of an optical signal output from a first port.

FIG. 17c is a diagram showing the optical spectrum of an optical signal output from a second port.

FIG. 17d is a diagram showing the spectrum of an electric signal output from a third port.

FIG. 18a shows a photoelectric oscillator according to the present invention that uses a radio-intensity RF signal driven optical phase modulator as a frequency multiplier optical modulator.

FIG. 18b is a diagram showing the spectrum of an unfiltered optical signal.

FIG. 18c is a diagram showing the spectrum of a filtered optical signal.

FIG. 18d is a diagram showing the spectrum of another filtered optical signal.

FIG. 19a is a diagram showing the spectrum of incident light.

FIG. 19b is a diagram showing the spectrum of modulated light.

FIG. 19c is a diagram showing the spectrum of light after the second modulation.

FIG. 19d is a diagram showing the spectrum of light reflected by the narrow band filter 5A.

FIG. 19e is a diagram showing the spectrum of light after the third modulation.

FIG. 19f is a diagram showing the spectrum of light reflected by the narrow band filter 5C after the third modulation.

FIG. 19g is a diagram showing the spectrum of output light.

FIG. 19h is a diagram showing the reflectance spectrum of the narrow band filter 5A.

FIG. 19i is a diagram showing the reflectance spectrum of the narrow band filter 5C.

FIG. 19j is a principle diagram for explaining the frequency multiplication operation in the configurations of FIGS. 17 and 18.

FIG. 20a shows a circuital structure frequency multiplier optical modulator.

FIG. 20b is a diagram showing the spectrum of light from output 10a.

FIG. 20c is a diagram showing the spectrum of light from output 10b.

FIG. 20d is a diagram showing the spectrum of radio signal from output 12.

FIG. 21a shows another fiber radio configured using a photoelectric oscillator of the present invention.

FIG. 21b is a diagram showing the spectrum of light from output 10 of fiber radio 21a.

FIG. 22a shows another fiber radio configured using a photoelectric oscillator of the present invention.

FIG. 22b is a diagram showing the spectrum of light from output 10 of fiber radio 21b.

DESCRIPTION OF THE PREFERRED EMBODIMENTS

Figure 2:
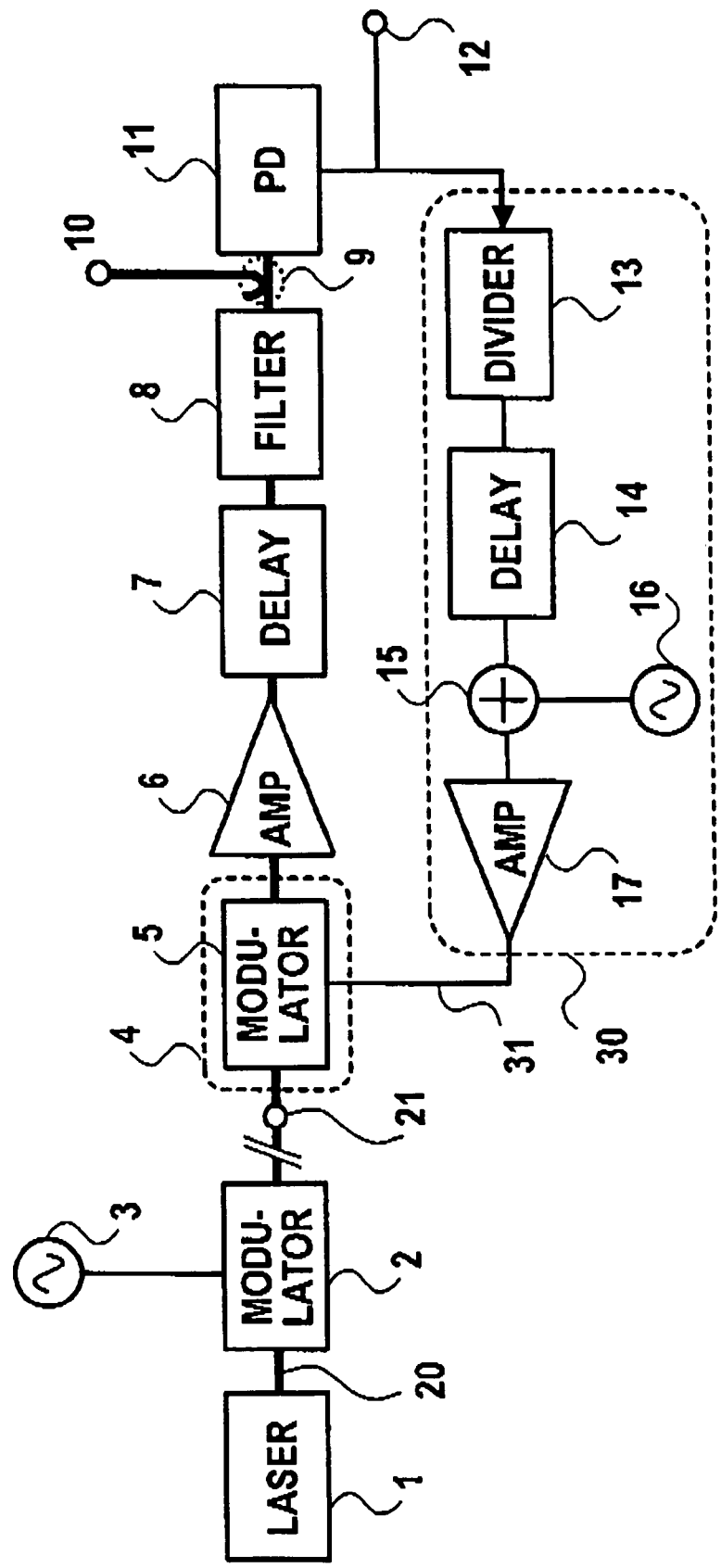
FIG. 2 is block diagram showing a preferred embodiment of the present invention.

FIG. 2 is block diagram showing a preferred embodiment of the present invention. A laser beam from a laser beam source 1 is modulated by an optical modulator 2. The modulation signal is supplied from an oscillator 3. This optical modulation is for inducing pull-in phenomenon in the photoelectric oscillator. When the pull-in phenomenon is not utilized, the optical modulator 2 can be omitted. The laser beam is projected from a projection unit 21 and supplied to an optical modulator 5. The optical modulator 5 is a resonant electrode optical modulator or a reciprocating optical modulator. The beam modulated by the optical modulator 5 is amplified by an optical amplifier 6 as required. Amplification is not necessary if the signal intensity is sufficient. After the beam has passed through the optical amplifier 6, it is sent to a delay circuit 7 to be delayed for a prescribed time period. The beam is then passed through an optical filter 8 to extract a signal in the frequency band used. Part of the output of the optical filter 8 is branched off by a turnout 9 to be output from the main unit 10. The remainder of the output is converted to an electric signal by a photoelectric converter 11. Part of the electric signal is output from an output 12 and the remainder is, as required, frequency divided by a divider 13. The electric signal from the divider 13 is delayed by a delay circuit 14 and then sent to a multiplexer 15 to be multiplexed with a radio-frequency electric signal from an oscillator 16. This multiplexing is for inducing pull-in phenomenon in the photoelectric oscillator. When the pull-in phenomenon is not utilized, the electric signal is not multiplexed. The output of the multiplexer 15 is amplified in an amplifier 17 and supplied as a modulation signal 31. When the superimposed signal has sufficient intensity, the amplification is not absolutely necessary.

The optical modulator 5 is equipped with a temperature control vessel 4 for stabilizing its operation. Moreover, the operating point of the optical modulator can be shifted slightly by varying the temperature setting of the temperature control vessel 4.

In the following, examples in which the optical modulator 5 is a resonant electrode optical modulator and a frequency multiplier modulator will be explained in this order.

Figure 3:
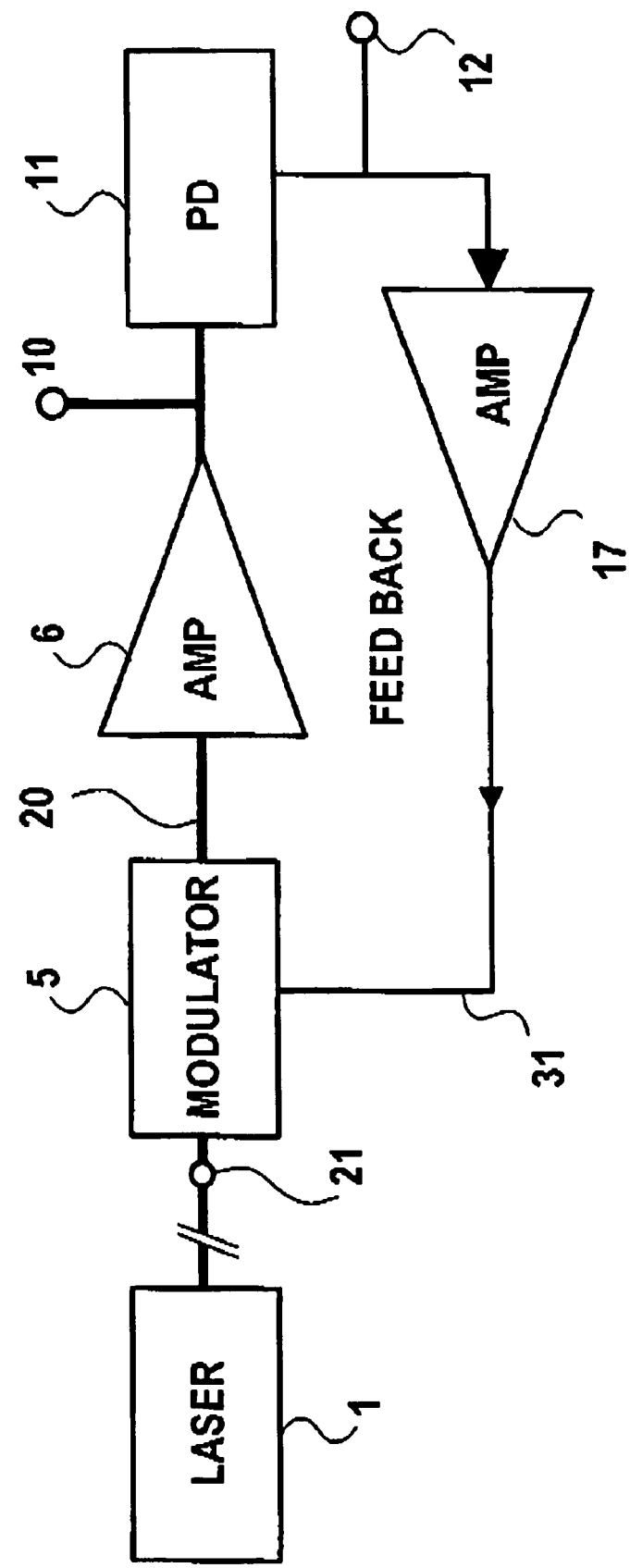
FIG. 3 is a block diagram showing a photoelectric oscillator that is a bare bones version of the oscillator of FIG. 2.

FIG. 3 is a block diagram showing a photoelectric oscillator that is a bare bones version of the oscillator of FIG. 2. In the configuration of FIG. 3, the laser beam from the laser beam source 1 is intensity modulated in the optical modulator 5. The optical modulator 5 is a resonant electrode optical modulator. The intensity-modulated beam is amplified in the optical amplifier 6 and then converted to a radio-frequency signal in the photoelectric converter 11 (for example, a photodiode). The radio-frequency signal is amplified in the amplifier 17 and again applied to the optical modulator 5 as a feedback signal. The first merit in this use of a resonant electrode optical modulator in the photoelectric oscillator is the high modulation efficiency of the modulator. Another merit is the modulator's small size.

Figure 4:
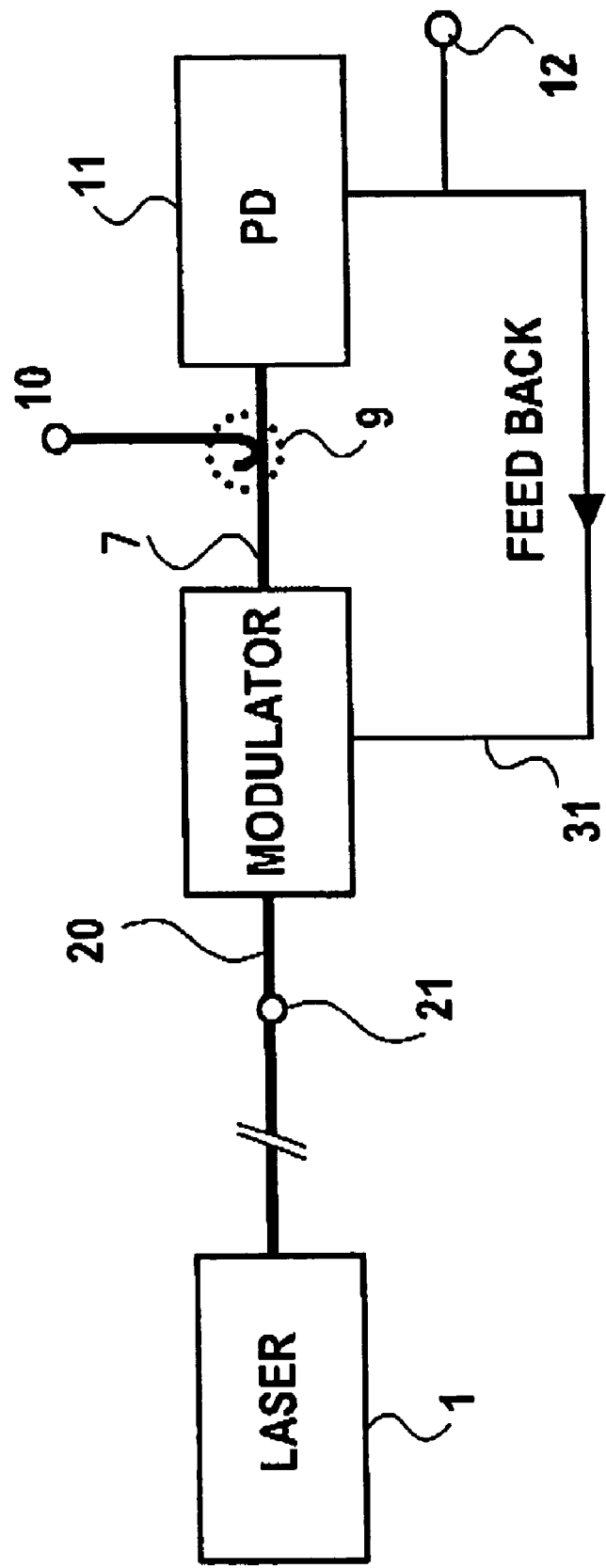
FIG. 4 is a block diagram showing a photoelectric oscillator similar to that of FIG. 3 but using a passive feedback circuit.
Figure 6A:
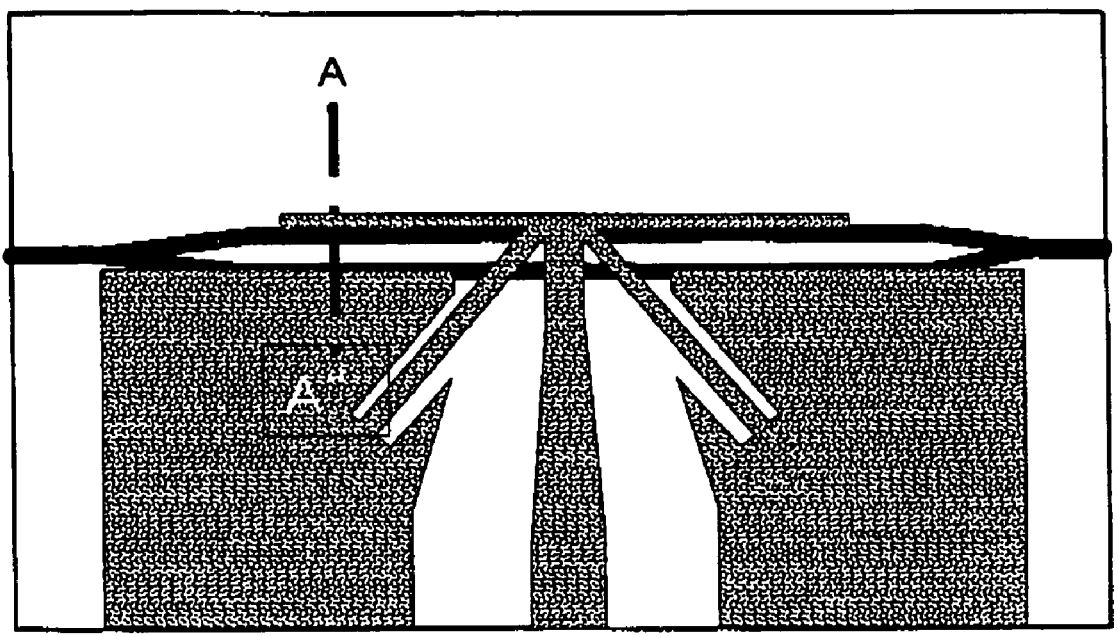
FIG. 6a is a front view of another resonant electrode optical modulator that can be used in the photoelectric oscillators of FIGS. 3 and 4.
Figure 6B:
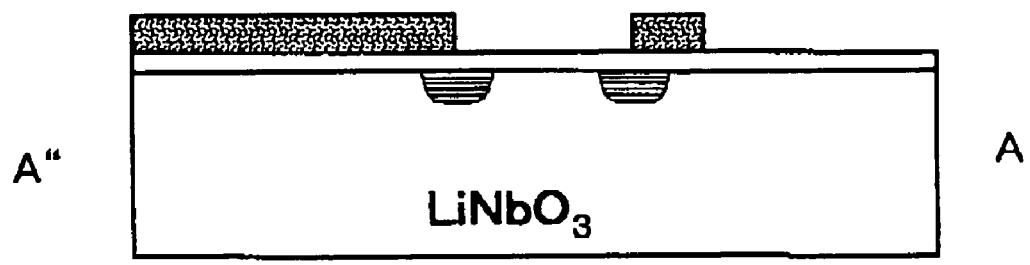
Figure 7A:
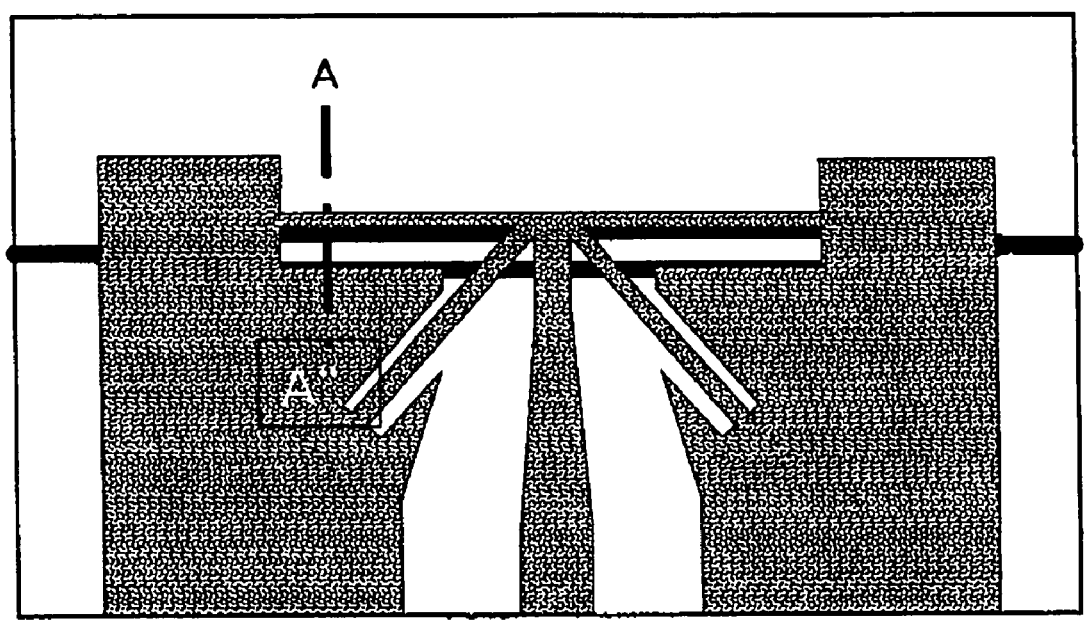
FIG. 7a is a front view of another resonant electrode optical modulator that can be used in the photoelectric oscillators of FIGS. 3 and 4.
Figure 7B:
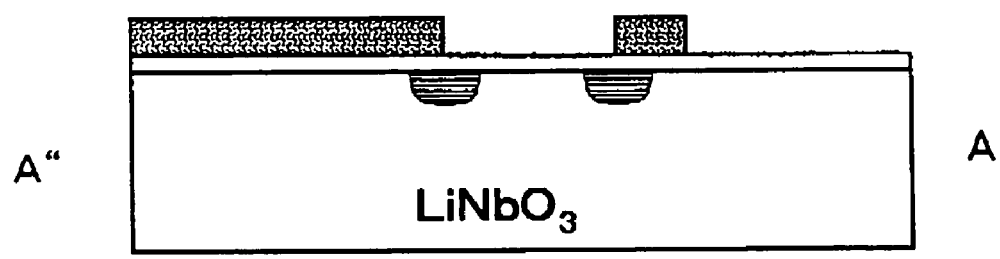

When the intensity of the beam projected into the photoelectric converter 11 is sufficiently high and the radio-frequency signal obtained is strong, or when the modulation efficiency of the resonant electrode optical modulator can be made sufficiently high, it is possible, as shown in FIG. 4, to maintain the radio-frequency oscillation using a feedback circuit that returns the output of the optical modulator 5 to the photoelectric converter without amplification. A point worth noting is that the feedback circuit is a passive circuit. In order to maintain radio-frequency oscillation in this circuit, the laser beam from the laser beam source 1 needs to be of considerably high intensity. It is known that there exist a photoelectric oscillator threshold above which oscillation starts and a threshold above which oscillation is maintained. As explained further later, this photoelectric oscillator is expected to be used in the fiber radio field. In the case of use in a fiber radio, ideally it should be possible to obtain a radio-frequency signal without supply of energy from a source other than the laser beam.

Figure 1:
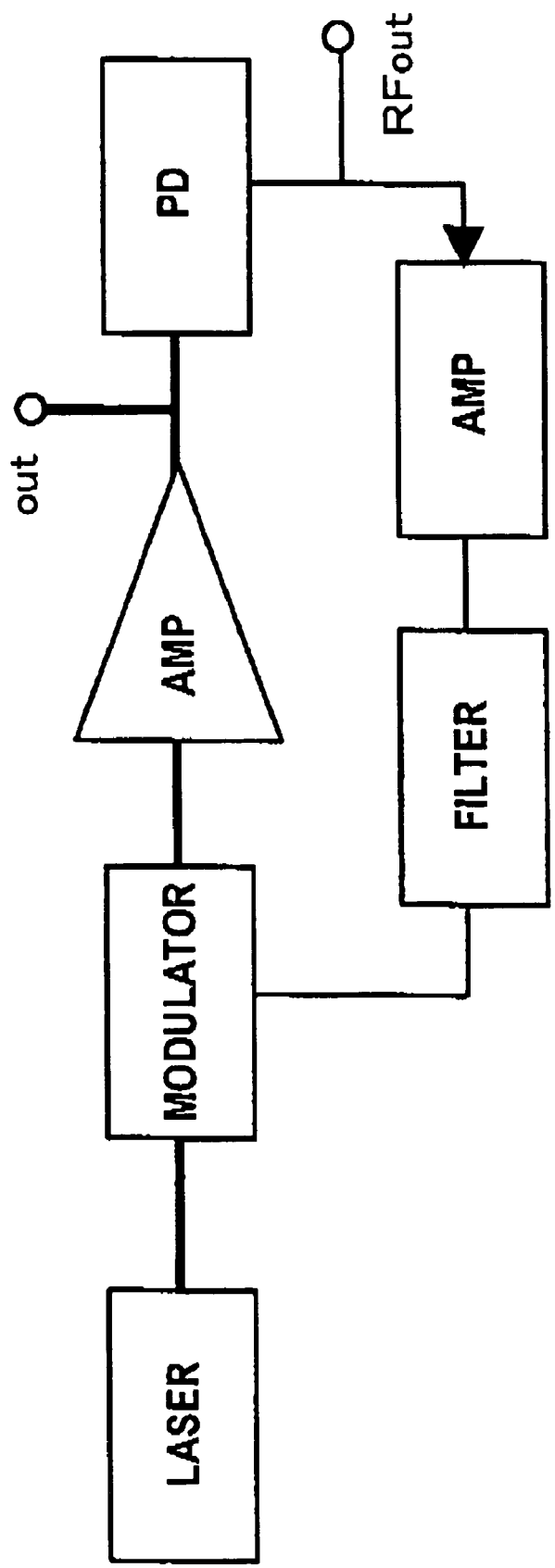
FIG. 1 is block diagram showing the structure of a conventional photoelectric oscillator.

The photoelectric oscillator of the present invention enables the threshold at which oscillation starts and the threshold at which oscillation is maintained to be made lower than in the case of the conventional photoelectric oscillator shown in FIG. 1. Since this is attributable to the high modulation efficiency of the resonant electrode optical modulator, it follows that a design that maximizes the modulation efficiency is preferably adopted. Boosting the modulation efficiency requires regulation of the resonance characteristic. It is known that the resonance characteristic can be improved by making the standing wave produced in the modulator sufficiently large. Further, as compared with the case of the conventional photoelectric oscillator shown in FIG. 1, size can be reduced by making the modulation electrode shorter. As a result, the time it takes for the signal to make one round of the circuit formed by the optical path and the feedback circuit can be shortened so that the oscillation spectrum interval determined by this time can be expanded to decrease the number of modes present in the resonance band of the resonant electrode optical modulator and thereby stabilize the oscillating operation.

As the resonant electrode optical modulator used in the configurations of FIGS. 3 and 4, it is possible to use the one shown in FIG. 5a obtained by providing an inductance matching capacitor in a symmetrical open stub modulation electrode or the one shown in FIG. 5b obtained by providing a ground electrode (or common electrode) around a symmetrical open stub modulation electrode. It is also possible to use a symmetrical electrode type resonant electrode optical modulator one that, shown in FIG. 6a, 6b and FIGS. 7a, 7b, is obtained by providing a stub at the feeding point of the modulation electrode. It is further possible to use a resonant electrode optical modulator that, as shown in FIGS. 8a, 8b and FIG. 9a, 9b, has a laterally asymmetrical modulation electrode.

The length of the resonant electrode used is determined such that when the basic resonant frequency is $f_0$, the basic resonant frequency of the resonant electrode is $f_0/n$ or $2f_0(2n+1)$, where n is a natural number.

Figure 8A:
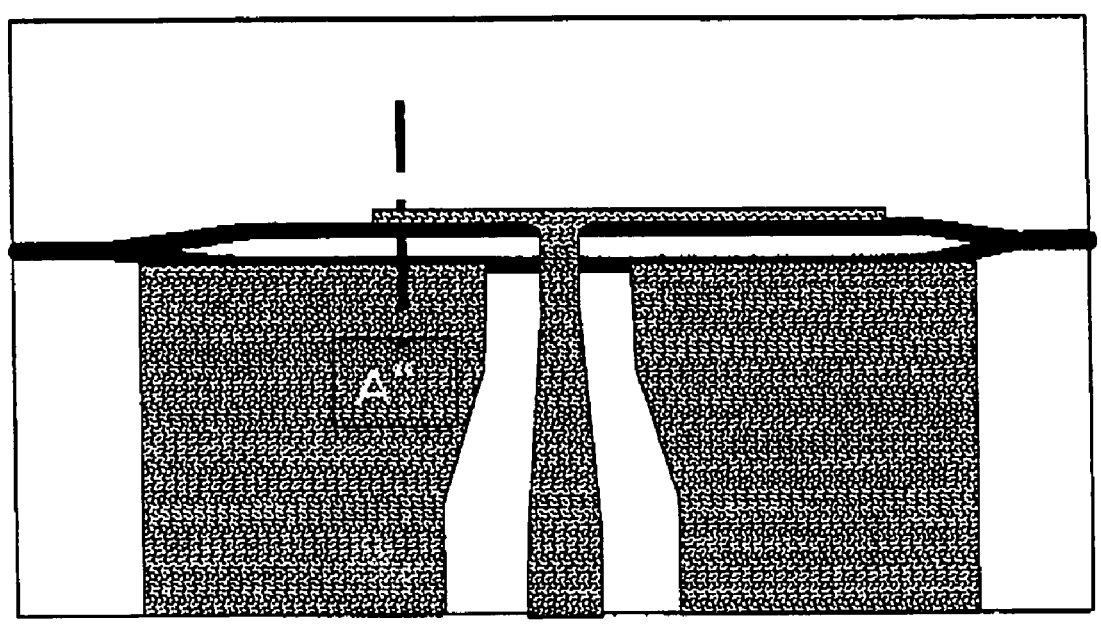
FIG. 8a is a front view of another resonant electrode optical modulator that can be used in the photoelectric oscillators of FIGS. 3 and 4.
Figure 8B:
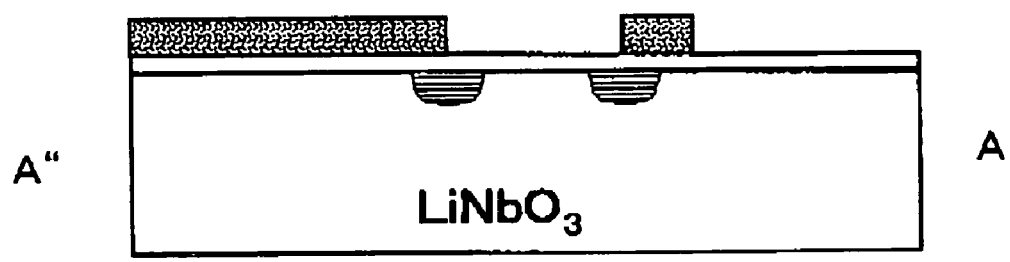

By way of example, a structure for using the resonant electrode optical modulator shown in FIG. 8a or 8b to intensity modulate a 1.55 micron wavelength light beam with a radio-frequency signal having a center frequency of 10 GHz will be explained. The distance between the open stub electrode on the left side and the common electrode, or ground electrode, is made 27 µm, the width is made 5 µm, and the length is made 1,710 µm (including have the width of the wire). This is 0.2 times the wavelength on the waveguide of the radio-frequency signal that is the modulation signal. On the other hand, the distance between the open stub electrode on the right side and the common electrode is made 27 µm, the width is made 5 µm, and the length is made 2,564 µm (including have the width of the wire). This is 0.3 times the wavelength on the light guide of the radio-frequency signal that is the modulation signal. 100 µm wires are provided between the feeding points and the tapered transformer. If a slight decline in performance can be tolerated, these wires can be omitted. The tapered transformer is for supplying the signal from the coplanar waveguide of the input section to the modulation electrode without returning it by reflection. It is 800 µm in length and its width slopes from 100 µm to 35 µm. In accordance with this slope, the distance from the common electrode also slopes from 325 µm to 107.5 µm.

Figure 9A:
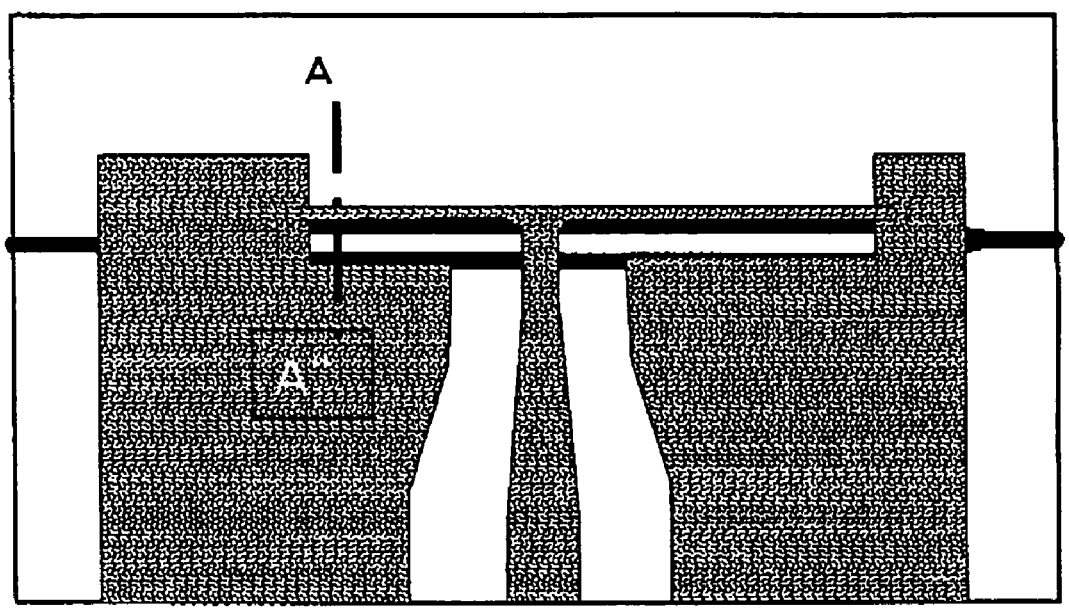
FIG. 9a is a front view of another resonant electrode optical modulator that can be used in the photoelectric oscillators of FIGS. 3 and 4.
Figure 9B:
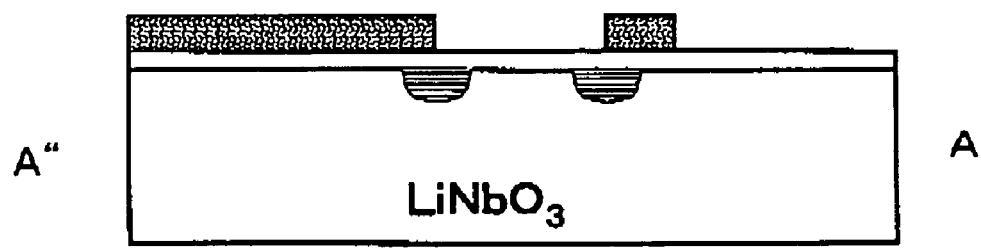
Figure 10A:
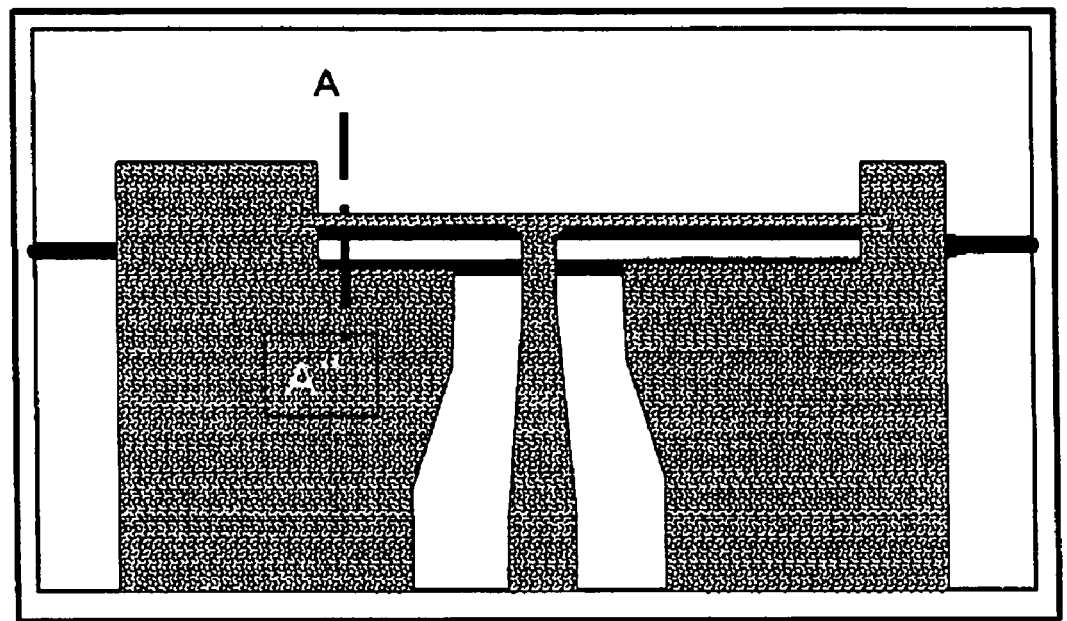
FIG. 10a a front view showing a structure for shifting the resonant point of the resonant electrode optical modulator shown in FIGS. 9a, 9b.
Figure 10B:
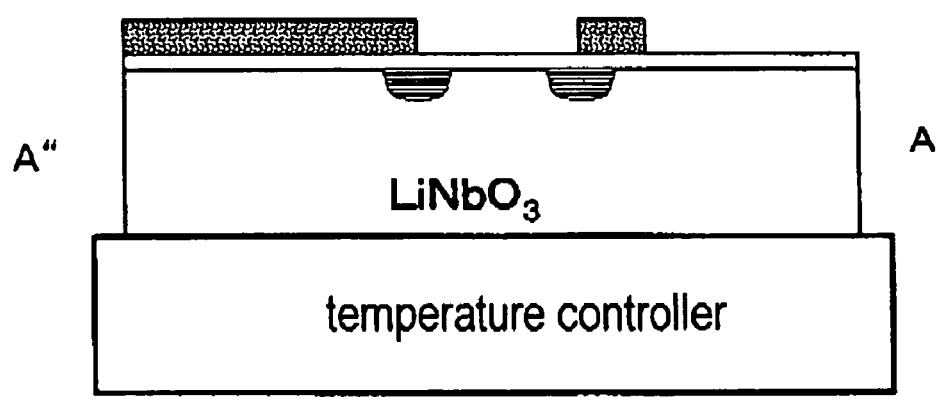

FIGS. 10a, 10b show a structure that can be used to shift the resonant point of the resonant electrode optical modulator shown in FIGS. 9a, 9b. The temperature of the modulator is regulated to vary a physical constant and thus shift the resonant point. A temperature controller is provided under an electro-optic substrate. This temperature controller can be a heater.

Figure 11:
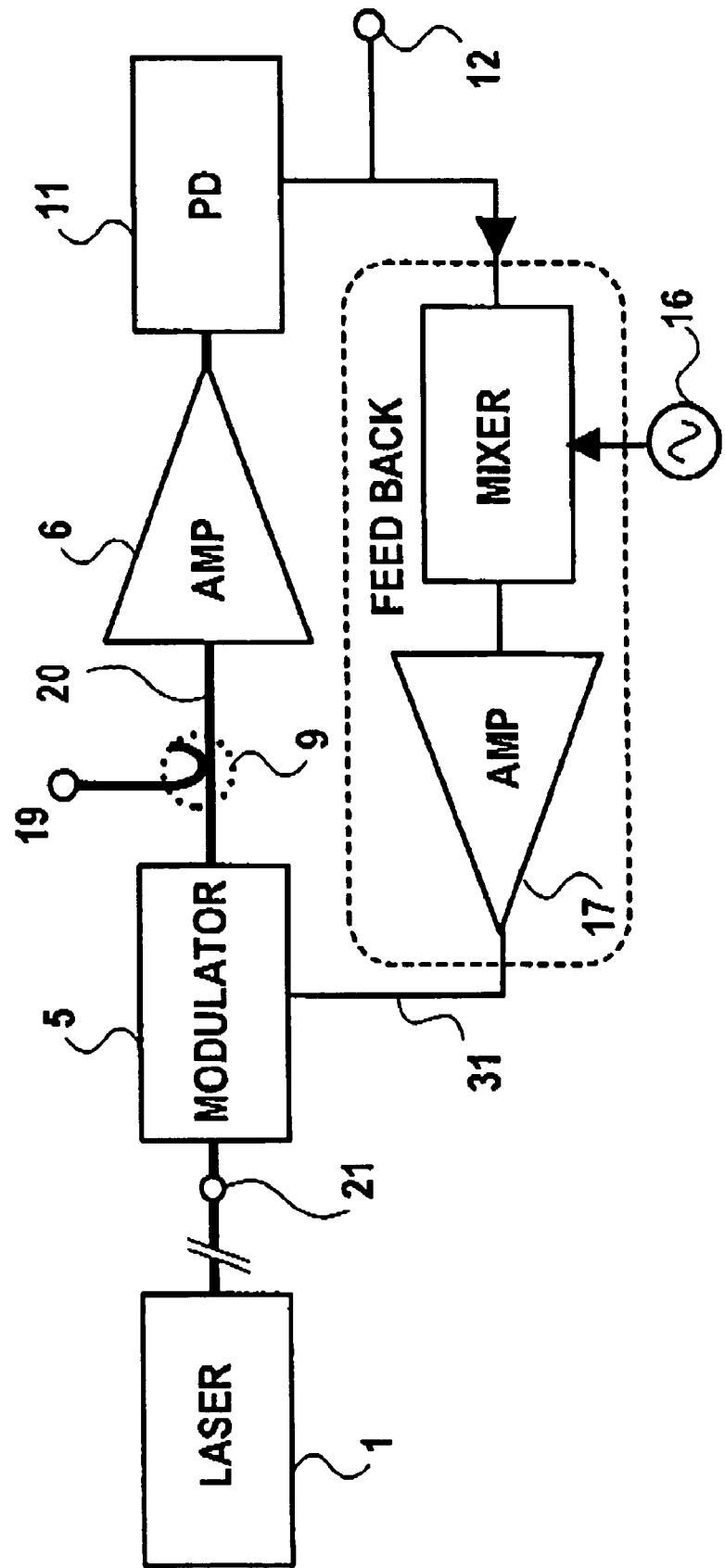
FIG. 11 is a block diagram showing a photoelectric oscillator configured for insertion of an external signal.

The block diagram in FIG. 11 shows a structure for superimposing an external signal on the output of the photoelectric oscillator shown in FIG. 3. Methods for superimposing the external signal include the optical signal injection method and the method of mixing the feedback signal and the external signal. These are explained in the following.

For injecting an external signal as an optical signal, either the laser beam is modulated by the external signal before the laser beam is projected, as shown in FIG. 2, or a laser beam 19 modulated by the external signal is injected into the optical path 20, as shown in FIG. 11. The injection is preferably conducted upstream of the optical amplifier 6.

Superimposition on the feedback signal is done for example using a multiplexer 15, as shown in FIG. 2. In the configuration of FIG. 11, a mixer is used as the multiplexer 15.

When these injections are done simultaneously using an optical signal and an electric signal contained in the same signal, the optical injection signal and the external signal superimposed on the feedback signal must be controlled so as not to become reversed in phase.

Figure 12:
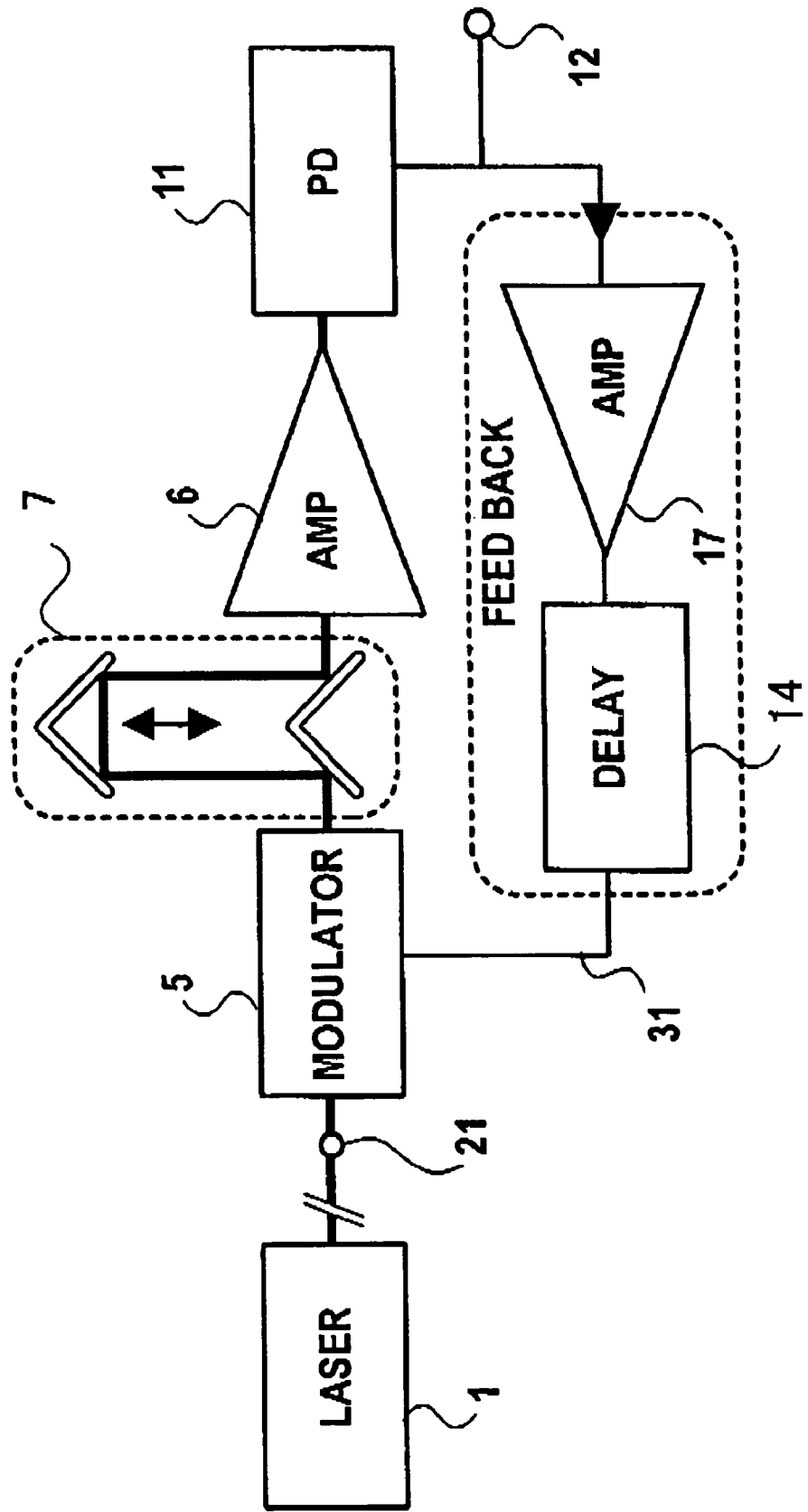
FIG. 12 is a block diagram showing a photoelectric oscillator whose feedback circuit is provided with a delay circuit.

Not only when injecting an external signal in the foregoing manner, but whenever it is desired to maintain the stability of the radio-frequency oscillation, the feedback signal should preferably be delayed using the delay circuit 14 in the feedback circuit, as shown in FIG. 12. Delay circuits of this type are well known and available on the market. The optical signal can also be delayed by the delay circuit 7 provided on the optical path 20. There is no reason for limiting the optical delay circuit used for this purpose to the one shown in FIG. 12 and any of various other types can be used instead.

Figure 13:
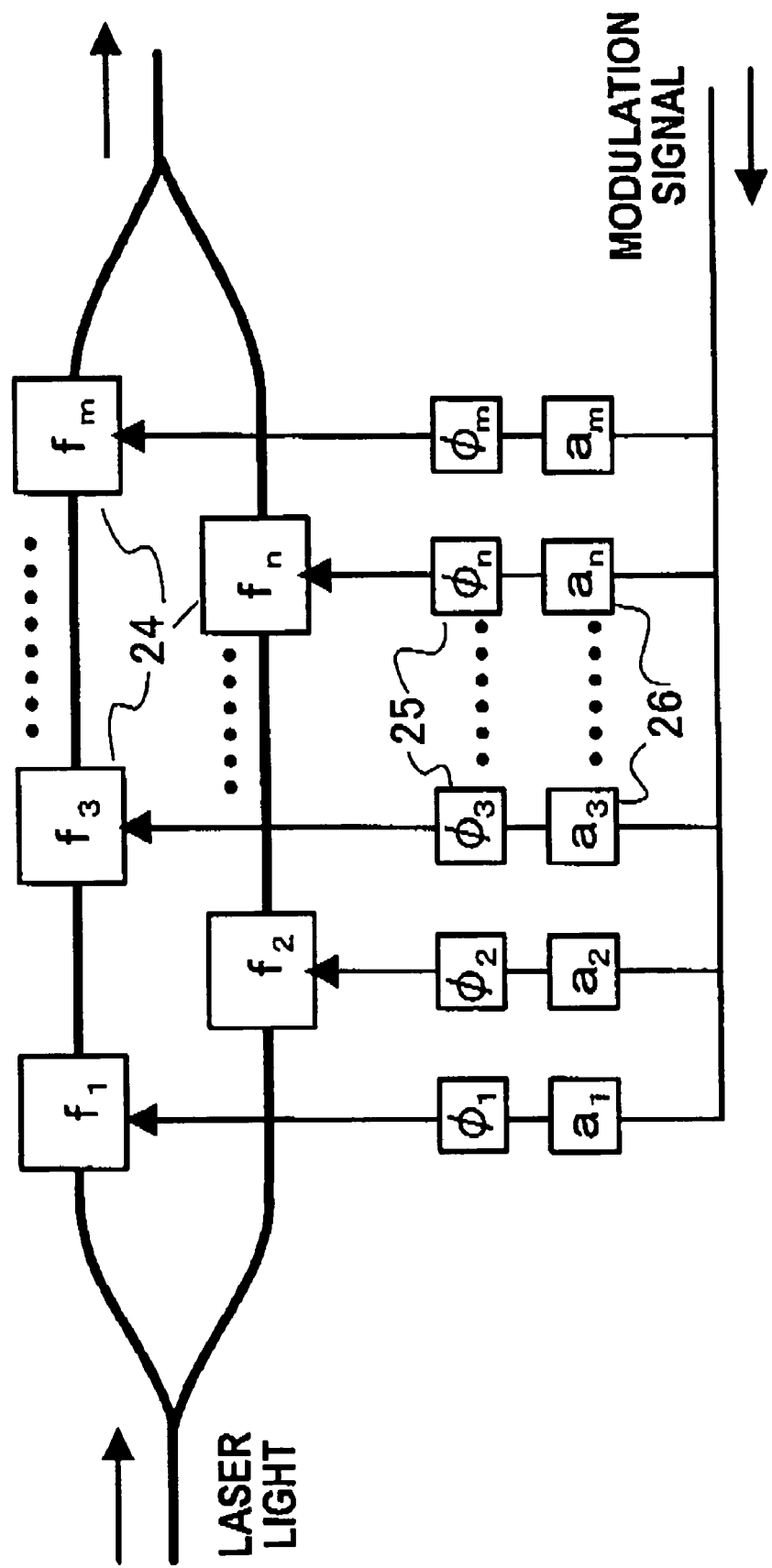
FIG. 13 is a block diagram showing the structure of an optical modulator.

A photoelectric oscillator according to the present invention that exhibits further unique features can be realized by structuring the optical modulator 5 shown in FIG. 2 as shown in FIG. 13. The structure of FIG. 13 consists of a plurality of resonant electrode optical modulator modulation electrodes disposed on the optical path of a Mach-Zehnder interferometer. This configuration is possible owing to the use of resonant electrode optical modulator modulation electrodes. Each of the modulation electrodes is supplied with a modulation signal whose amplitude is regulated by an attenuator 26 and whose phase is regulated by a phase shifter 25.

The degree of modulation in the small region can be made to approach $$T(f) = \sum_k a_k e^{j\phi_k} M_k(f) \quad \text{Eq. (1)}$$

where
  $a_k$: Voltage applied to modulation electrodes (adjusted by variable attenuator preceding modulation electrode)
  $\phi_k$: Delay up to start of optical modulation (adjusted by phase shifter preceding modulation electrode)
  M(f): Transfer function of resonant electrodes
  T(f): Frequency characteristic of modulation efficiency.

As a result, it is possible to synthesize a desired transfer function, provided that it is within the range of the characteristic distribution of the modulation electrodes. The following striking features are observed, for example:

1) When the modulation electrode structure is made the same throughout, modulation is applied in the same phase to the modulation electrodes on the individual optical paths of the Mach-Zehnder interferometer and modulation is applied in reverse phase to the modulation electrodes on other optical paths, the transfer function of a sharp bandpass filter is obtained to enhance the Q value of photoelectric oscillator as a whole.

2) The oscillation frequency can be selected by using an electrode of a different resonant frequency adjusting the attenuator 26 to control $a_k$.

Figure 14:
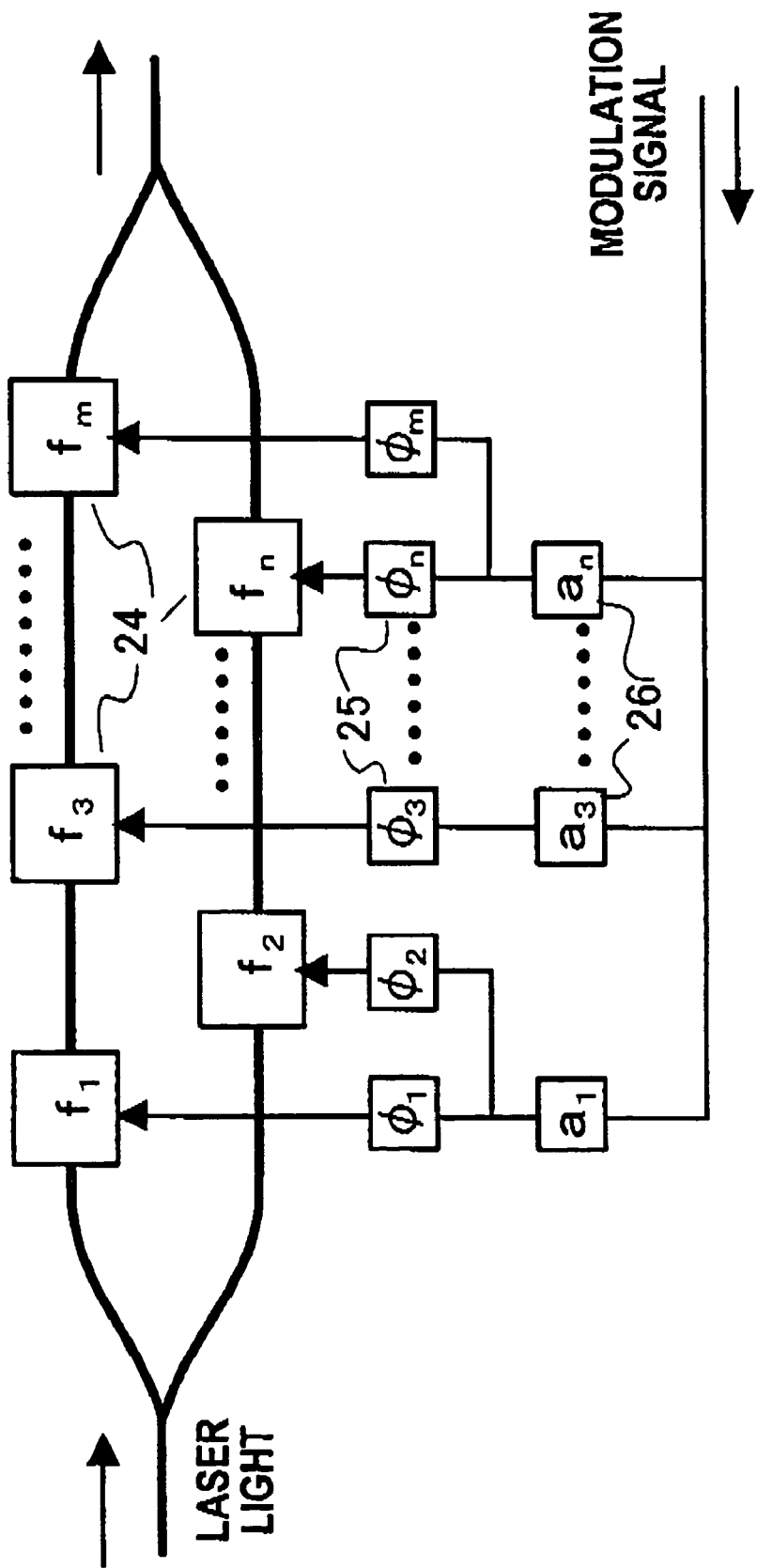
FIG. 14 shows a modification of the structure of FIG. 13 configured to reduce the number of components.

FIG. 14 shows a modification of the structure of FIG. 13 configured to reduce the number of components. In the illustrated case, the paired modulation electrode (resonant frequency=f1) and modulation electrode (resonant frequency=f2), for example, have the same electrode structure and the same amplitude but are applied with modulation signals differing in phase. Similarly, the paired modulation electrode (resonant frequency=fn) and modulation electrode (resonant frequency=fm) have the same electrode structure and same amplitude but are applied with modulation signals differing in phase. This regulation mode also enables increase the number of frequency characteristic choices.

In the case of the configuration of FIG. 13 or 14, the resonance characteristics of the modulation electrodes are preferably given a distribution so that they line up with each overlapping the next at approximately their half values of a plot between the modulation degree and resonant frequency as shown in FIG. 15. This distribution is suitable for continuous control of photoelectric oscillator oscillation frequency. On the other hand, when there are no overlapping regions, the transfer functions that can be synthesized are discretely distributed. Such a distribution is suitable for discrete control of photoelectric oscillator oscillation frequency.

Figures 16A, 16B:
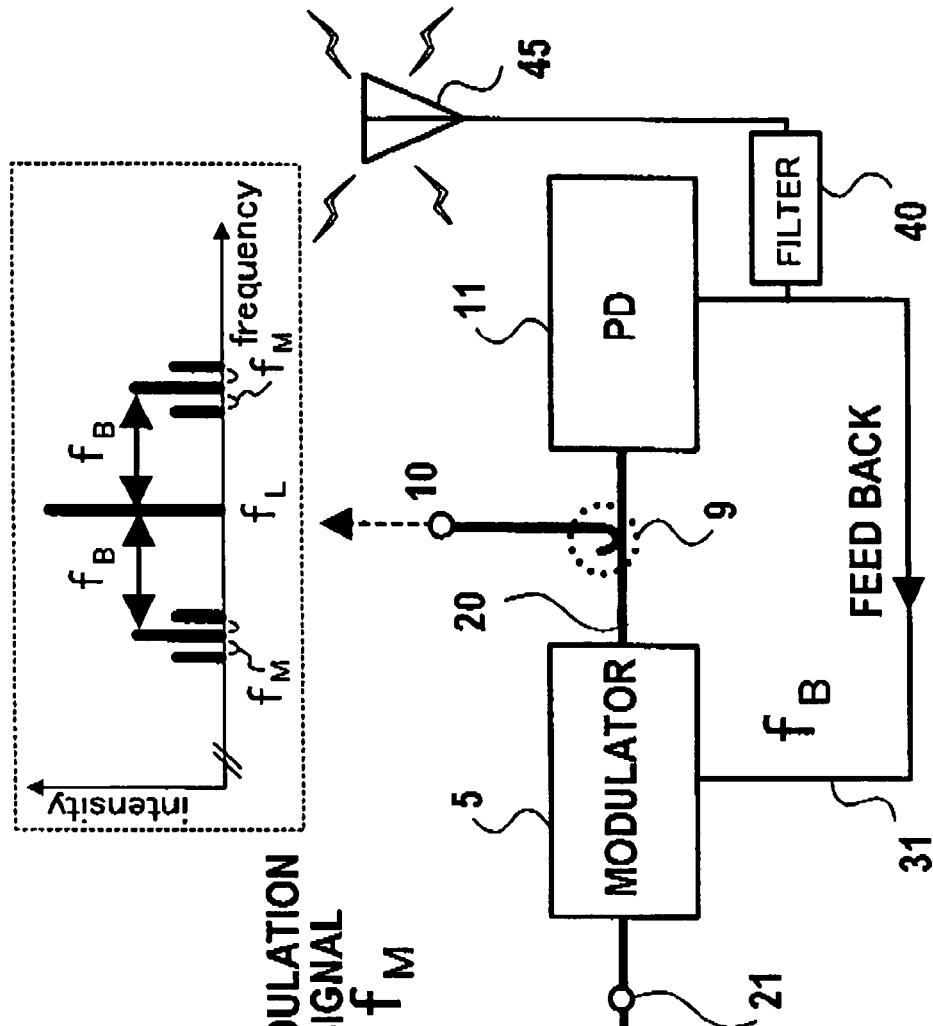
FIG. 16a shows a fiber radio configured using a photoelectric oscillator of the present invention.
FIG. 16b is a diagram showing the optical spectrum of an output optical signal.

As shown in FIG. 16a, the photoelectric oscillator of the present invention can be used to configure a fiber radio. In this case, the laser beam from the laser beam source 1 (frequency=$f_L$) is modulated in the optical modulator 2 by a modulation signal of frequency $f_M$ and sent through the transmission path 20 to produce RF oscillation (frequency=$f_B$) in the feedback circuit composed of the optical modulator 5 and the photoelectric converter 11. The RF signal is transmitted together with the aforesaid modulation signal of frequency $f_M$. The spectrum of the optical signal in this case is shown in FIG. 16b.

FIG. 17a shows an example in which a frequency multiplier optical modulator is used as the optical modulator 5. In the configuration of FIG. 17a, the laser beam from the laser beam source 1 is led to the frequency multiplier optical modulator 5 where it is subjected to modulation by a radio-frequency signal of frequency $f_m$ input from a modulation electrode. The frequency multiplier optical modulator 5 has a port 10a for outputting optical modulated signals of a high-order. (N) multiplied frequency N×$f_m$. The frequency multiplier modulator is an optical modulator capable of multiplying input modulation frequencies. N is an integer of 2 or greater whose value depends on the type of optical modulator. The optical modulated signals are amplified in the optical amplifier 6 and a part thereof is output from the output port 10a. The remainder of the optical modulated signals is sent to the optical filter 8, which selects part thereof, e.g., the upper band portion, and outputs it from an output port 10b. The remainder of the light selected by the optical filter 8 is converted to a radio-frequency signal by the photoelectric converter 11, which uses a photodiode for the conversion. Part of the radio-frequency signal is output from the RF output port 12 and the remainder is returned to the frequency multiplier optical modulator 5 as a feedback signal after amplified by amplifier 17.

If the feedback gain of the feedback circuit is set sufficiently high in the foregoing photoelectric oscillator using a frequency multiplier optical modulator, the oscillator begins photoelectric oscillation at the frequency $f_m$. As in an ordinary oscillator, there is an oscillation threshold, i.e., oscillation starts when feedback gain exceeds feedback loop loss. During oscillating operation, it is possible to simultaneously extract an electrical oscillation signal of frequency $f_m$ from the RF output port 12 in FIG. 17a, an optical signal modulated by the signal of frequency $f_m$ from the optical output port 10b, and a frequency multiplied optical modulated signal from the optical output port 10a.

In the photoelectric oscillator of FIG. 17a using a frequency multiplier optical modulator, the optical circuit portions from the output of the frequency multiplier optical modulator to the input of the photoelectric converter can be constituted as a linear circuit. The constituent components can therefore be connected in any desired order. Moreover, for the same reason, the constituent components of the electric circuit from the output of the photoelectric converter to the input of the frequency multiplier optical modulator can also be connected in any desired order.

The optical modulation signal output from the optical output port 10b of the photoelectric oscillator using a frequency multiplier optical modulator of FIG. 17a can be photoelectrically converted using an optical detector (not shown) to obtain a radio-frequency signal of a frequency equal to or higher than $N \times f_m$.

FIG. 18a shows the basic structure in the case of using an optical phase modulator driven by an amplified radio-frequency signal (hereinafter called a "radio-intensity RF signal driven optical phase modulator") as one example of the frequency multiplier optical modulator used in the photoelectric oscillator of FIG. 17a. In this example, N=6. It is generally known that when a high-intensity radio-frequency signal is introduced into an optical modulator, the nonlinearity of the intensity-modulation, phase modulation, frequency modulation or other optical modulation induces high-order side band components in the modulated signal. In particular, optical phase modulation is basically nonlinear and, as such, is known to enable generation of high-order side band components with a simple configuration. The aforesaid high-intensity RF signal driven optical phase modulator is constituted of an optical modulator, a radio-frequency amplifier for amplifying the modulated signal, and an optical filter. When the optical phase modulator of the circuit of FIG. 18a is input with a sufficiently amplified sinc wave signal of frequency $f_m$, an optical spectrum like that exemplified in FIG. 18b is obtained. When this is input to an optical filter 8a having a discrete modulation interval that is an integral (N) multiple of $f_m$ and multiple transmission fringes, there can be obtained an optically modulated signal carrying sidebands at a frequency distance of $N \times f_m$ as exemplified by the spectrum shape shown in FIG. 18c. Moreover, by inputting the optical output of the optical phase modulator into an optical filter 8b having a polymodal transmission characteristic or an optical bandpass filter 8b having a transmission band width of $f_m$ or greater, there can be obtained optically modulated signals having a frequency spacing of $f_m$ as exemplified in FIG. 18d.

When the radio-intensity RF signal driven optical phase modulator shown in FIG. 18a is used in the photoelectric oscillator of FIG. 17a, the output signal of the fn frequency optical filter 8b is used as the feedback signal of the photoelectric oscillator and sent to the photoelectric converter section through an optical amplifier. Further the output signal from the $N \times f_m$ optical filter 8a is used as the multiplier optical modulator output. The functions of the optical filters 8a, 8b can instead be implemented concomitantly with the optical filter circuit used in the photoelectric oscillator of the configuration shown in FIG. 17a.

FIG. 19j shows the basic structure in the case of, as another example, using a reciprocal multiplier optical modulator as the frequency multiplier optical modulator in the configuration shown by the block diagram of FIG. 17a. The reciprocal multiplier optical modulator is formed of an optical phase modulator and two band-reflection filters. The optical phase modulator can be one according to the prior art, such as an optical phase modulator that utilizes an electro-optic effect in LiNbO$_3$ crystal. As the band-reflection filter can be used one with, for example, optical fiber grating.

The principle of the frequency multiplication operation in the aforesaid configuration will now be explained with reference to the principle diagram of FIG. 19. The frequency $f_0$ input to the optical filter 5A is subjected to modulation by the modulator 5B to produce sideband components. For simplicity, nonlinear components are slight in the modulation method used here and the produced sideband components consist of a first-order double sideband and a weak second-order sideband. This light signal is reflected by the modulator 5C to reenter the optical modulator. At this time, the carrier wave and the double sideband are modulated to obtain the spectrum shown in FIG. 19c. The carrier wave passes through the optical filter 5A so that only the sideband is reflected, as shown in FIG. 19d. With further modulation, the spectrum becomes that shown in FIG. 19e. The modulated component is repeatedly reflected between the optical filter 5A and the optical filter 5C to produce a still higher order sideband signal. Finally, a high-order sideband signal falling outside the reflection band of the optical filter 5C and passes through the optical filter 5C. Frequency multiplication is realized owing to beating of the obtained sideband signals. When the modulation characteristic is only slightly nonlinear, a second-order sideband is produced at every modulation, in the foregoing manner. As a result, the sidebands contained in the output are ones having two consecutive integer orders.

Since the purpose of the optical modulator shown in the block diagram of FIG. 19j is to generate sidebands, it can be a different type of optical modulator, such as an intensity modulator. When sideband components of sufficient intensity can be generated, it suffices to use a modulation method that is low in nonlinear components. Combined use of the high-intensity RF signal drive optical phase modulator of FIG. 18a enables further improvement of high-order sideband component generation efficiency.

When the reciprocal multiplier optical modulator is used in the photoelectric oscillator of FIG. 17a, it is supplied with the output of the radio-frequency amplifier 17, i.e., the feedback signal of the photoelectric oscillator, as the modulation signal. Since the frequency difference $f_m$ signal is output from the reciprocal multiplier optical modulator, this can be optically modulated to obtain the frequency $f_m$ radio-frequency signal. In order to use this as the feedback signal of the photoelectric oscillator, it is input to the photoelectric converter 11 through the optical amplifier 6. For obtaining the intensity modulated component of the $f_m$ feedback signal at this time, the upper sideband and the lower sideband component are selected by the optical filter 8b. However, by adopting a design that makes the optical transmission characteristics of the narrow band optical filters 5A and 5C used in reciprocal multiplication modulation shown in FIG. 19j asymmetrical in terms of frequency, the ratio between the upper sideband and lower sideband components can be varied to obtain the intensity modulated component of the feedback signal. In this case, the optical filter 8b is unnecessary. It is also possible to lower the reflection rate of the narrow filter on the output side in optical filter 5C and use the leaked optical signal from the reflection band as the $f_m$ feedback signal. In this case, as explained above, the intensity modulated component of the feedback signal is selected by the optical filter 8b or the like.

As one example of the frequency multiplier optical modulator shown in the block diagram of FIG. 17, it is suitable to use a circuital structure frequency multiplier optical modulator of the basic configuration shown in FIG. 20. Part of the output of the optical modulator is supplied to the optical modulator input through a loop structure and, like in a reciprocal multiplier structure, high-order sideband components are generated with high efficiency by repeated input of the modulated light. The method of connection to the photoelectric oscillator is also the same as in the case of the reciprocal multiplier structure photoelectric oscillator.

As shown in FIG. 21a, the aforesaid photoelectric oscillator can be used to configure a fiber radio. In this case, the feedback signal in the photoelectric oscillator is modulated with a data modulation signal or light modulated with a frequency $f_M$ radio-frequency signal superimposed with a data signal advances through the transmission path 20 to a photoelectric oscillator having a feedback signal frequency $f_B$, and using a frequency $n \times f_a$ signal as a sub-carrier, n being a predetermined natural number, to obtain light modulated with a frequency $f_M$ RF signal. This signal is photoelectrically converted and the required signal is selected using a filter. By this there can be obtained a radio wave that is a frequency $n \times f_a$ carrier modulated by a frequency $f_M$ signal.

Further, as shown in FIG. 22a, the optical signal modulated with the frequency $f_M$ radio-frequency signal can be passed through the aforesaid photoelectric oscillator to obtain an optical signal having a frequency $n \times f_a$ signal as a subcarrier. This optical signal is transmitted on the optical path 20 and input to a wireless transmitter. In the wireless transmitter, it is converted to a wireless signal by square-law detection in a photoelectric converter and transmitted from an aerial.

The foregoing methods are characterized in the point that the frequency multiplication system of a photoelectric oscillator utilizing a frequency multiplier optical modulator enables configuration of a fiber radio system whose carrier is a radio-frequency signal not achievable with an ordinary electrical oscillator.

As set out in the foregoing, the photoelectric oscillator of the present invention is configured to utilize a resonant electrode optical modulator. Since it is therefore high in modulation efficiency and small in size, the laser beam intensity threshold at which radio-frequency oscillation starts can be lowered. Further, a large number of the modulation electrodes can be arrayed and the resulting configuration be used to vary the oscillation wavelength.

As set out in the foregoing, the photoelectric oscillator of the present invention is configured to utilize a frequency multiplier optical modulator. Since it is therefore capable of generating an optical modulation signal of a frequency that is an integral multiple of that by an electrical method, the invention can be used to realize radio-frequency oscillator capability impossible or difficult to achieve by conventional electrical techniques, simply and at low cost.

Moreover, the photoelectric oscillator of the present invention incorporates oscillation frequency amplitude control capability and frequency control capability. By utilizing these control features, information can be carried on the generated radio-frequency signal. Thus the oscillator of the present invention can be used to configure a fiber radio.

What is claimed is:

1. A photoelectric oscillator comprising:
   a laser beam projection unit;
   an optical modulator on an optical path extending from the projection unit, which optical modulator outputs a modulated signal or an optical signal containing a harmonic of the modulated signal and includes a modulation electrode whose resonant radio-frequency band includes the frequency band of the modulation signal;
   a photoelectric converter configured to convert the output of the optical modulator to an electric signal;
   a temperature adjustment device of the optical modulator having a resonant electrode structure and configured to regulate the oscillation frequency of the photoelectric oscillator;
   a feedback circuit configured to feed an oscillating radio-frequency electric signal obtained from the photoelectric converter back to the optical modulator; and
   an output section configured to output an optical signal containing the modulation signal or a harmonic of the modulation signal or outputting the modulation signal or a harmonic of the modulation signal,
   a laser beam of sufficient intensity being input from the projection unit configured to produce a radio-frequency electric signal in the feedback circuit, and the radio-frequency electric signal or an optical signal containing the radio-frequency electric signal or the radio-frequency signal being output from the photoelectric oscillator.

2. A photoelectric oscillator according to claim 1 wherein the feedback circuit is provided with an amplifier having a frequency characteristic that partially overlaps the resonant radio-frequency band of the optical modulator.

3. A photoelectric oscillator according to claim 1, wherein the feedback circuit is provided with a delay circuit capable of delay time adjustment.

4. A photoelectric oscillator according to claim 1, wherein the output from the optical modulator is amplified in an optical amplifier and supplied to the photoelectric converter.

5. A photoelectric oscillator according to claim 1, wherein optical modulator is a reciprocating optical modulator whose the resonant frequency band of the modulation electrode of the modulator includes the frequency band of the modulation signal and that repeats modulation every reciprocation on a reciprocal optical path.

6. A photoelectric oscillator according to claim 1, wherein the optical modulator is formed using an optical modulator that has an optical path of loop structure and repeats modulation every circuit of the optical path.

7. A photoelectric oscillator according to claim 1, wherein the feedback circuit is provided with an electrical amplifier having a characteristic such as to selectively amplify the radio-frequency band of the feedback signal.

8. A photoelectric oscillator according to claim 1, wherein the optical modulator is an optical phase modulator and an optical filter is provided between the optical modulator and the photoelectric converter to suppress those radio-frequency signal components of the optical spectrum spread by the modulation by the optical phase modulator that are not to be fed back as modulation signals.

9. A photoelectric oscillator according to claim 1, further comprising a delay circuit provided on the optical path between the optical modulator and the photoelectric converter capable of delay time adjustment.

10. A photoelectric oscillator according to claim 1, wherein a second radio-frequency electric signal is injected for an injection-locked operation into the feedback circuit to output a radio-frequency signal synchronized with the second radio-frequency electric signal or an optical signal containing a multiplied second radio-frequency electric signal.

11. A photoelectric oscillator according to claim 1, wherein the optical modulator is a frequency multiplier modulator whose input is an optical signal superimposed with a radio-frequency electric signal and whose output is a multiplied radio-frequency electric signal synchronized with the input radio-frequency electric signal or an optical signal containing a radio-frequency electric signal synchronized with the radio-frequency electric signal.

12. A photoelectric oscillator comprising:
   a laser beam projection unit;
   an optical modulator on an optical path extending from the projection unit, which optical modulator outputs a modulated signal or an optical signal containing a harmonic of the modulated signal and includes a modulation electrode whose resonant radio-frequency band includes the frequency band of the modulation signal;
   a photoelectric converter configured to convert the output of the optical modulator to an electric signal;
   a feedback circuit configured to feed an oscillating radio-frequency electric signal obtained from the photoelectric converter back to the optical modulator; and
   an output section configured to output an optical signal containing the modulation signal or a harmonic of the modulation signal or outputting the modulation signal or a harmonic of the modulation signal, a laser beam of sufficient intensity being input from the projection unit to produce a radio-frequency electric signal in the feedback circuit, and the radio-frequency electric signal or an optical signal containing the radio-frequency electric signal or the radio-frequency signal being output from the photoelectric oscillator, wherein the optical modulator is a Mach-Zehnder interference modulator on two constituent optical paths of which are provided multiple phase modulators having resonant electrode structures of differing resonant frequency, each of the phase modulators being applied with a signal obtained by regulating the amplitude or phase of the optical modulator output and further provided with means for varying said amplitude or phase to control the transmission frequency characteristic of the Mach-Zehnder interference modulator with respect to the radio-frequency electric signal.

13. A photoelectric oscillator comprising:

a laser beam projection unit;

an optical modulator on an optical path extending from the projection unit, which optical modulator outputs a modulated signal or an optical signal containing a harmonic of the modulated signal and includes a modulation electrode whose resonant radio-frequency band includes the frequency band of the modulation signal;

a photoelectric converter configured to convert the output of the optical modulator to an electric signal;

a feedback circuit configured to feed an oscillating radio-frequency electric signal obtained from the photoelectric converter back to the optical modulator; and an output section configured to output an optical signal containing the modulation signal or a harmonic of the modulation signal or outputting the modulation signal or a harmonic of the modulation signal, a laser beam of sufficient intensity being input from the projection unit to produce a radio-frequency electric signal in the feedback circuit, and the radio-frequency electric signal or an optical signal containing the radio-frequency electric signal or the radio-frequency signal being output from the photoelectric oscillator, wherein the optical modulator is a Mach-Zehnder interference modulator on two constituent optical paths of which are provided multiple phase modulators having resonant electrode structures of differing resonant frequency, each of the phase modulators being applied with a signal obtained by regulating the amplitude or phase of the optical modulator output and further provided with means for varying said amplitude or phase to control the transmission frequency characteristic of the Mach-Zehnder interference modulator with respect to the radio-frequency electric signal, wherein the phase modulators provided on the first optical path of the two constituent optical paths of the Mach-Zehnder interference modulator and the phase modulators provided on the second optical path thereof have a common resonance band and a radio-frequency signal belonging to the common resonance band is applied to the phase modulators of the two paths at a predetermined phase, the radio-frequency signal being the output signal of the photoelectric converter.

* * * * *